United States Patent
Chen et al.

(10) Patent No.: US 10,725,203 B2
(45) Date of Patent: Jul. 28, 2020

(54) DUAL-SENSOR TOOL OPTICAL DATA PROCESSING THROUGH MASTER SENSOR STANDARDIZATION

(71) Applicant: Halliburton Energy Services, Inc., Houston, TX (US)

(72) Inventors: Dingding Chen, Tomball, TX (US); Bin Dai, Spring, TX (US); Jing Shen, Houston, TX (US); Ming Gu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 516 days.

(21) Appl. No.: 15/303,299

(22) PCT Filed: Nov. 18, 2015

(86) PCT No.: PCT/US2015/061321
§ 371 (c)(1),
(2) Date: Oct. 11, 2016

(87) PCT Pub. No.: WO2017/086949
PCT Pub. Date: May 26, 2017

(65) Prior Publication Data
US 2017/0269260 A1    Sep. 21, 2017

(51) Int. Cl.
*E21B 47/10* (2012.01)
*G01V 13/00* (2006.01)
(Continued)

(52) U.S. Cl.
CPC .............. *G01V 13/00* (2013.01); *E21B 47/06* (2013.01); *E21B 47/065* (2013.01);
(Continued)

(58) Field of Classification Search
None
See application file for complete search history.

(56) References Cited

U.S. PATENT DOCUMENTS 6,799,117 B1 * 9/2004 Proett .................... E21B 49/08
702/12
7,305,306 B2 * 12/2007 Venkatarannanan ... E21B 49/00
702/9
(Continued)

FOREIGN PATENT DOCUMENTS

WO    2008093054 A2    8/2008
WO    2009009409 A1    1/2009
WO    WO-2014137354 A1 *    9/2014

OTHER PUBLICATIONS

ISR/WO for PCT/US2015/061321 dated Aug. 18, 2016.

*Primary Examiner* — Lina M Cordero
(74) *Attorney, Agent, or Firm* — Gilliam IP PLLC

(57) ABSTRACT

A method may include collecting measurement data using a first operational sensor and a second operational sensor of a downhole tool, standardizing optical responses of each operational sensor to a master sensor in a tool parameter space to obtain a standardized master sensor response, transforming the standardized master sensor response to a synthetic parameter space response of the master sensor, applying a fluid model with the synthetic parameter space response of the master sensor to predict a fluid characteristic, comparing a first prediction obtained with the fluid model from the first operational sensor with a second prediction obtained with the fluid model from the second operational sensor, determining a fluid characteristic from the first prediction and the second prediction, and optimizing a well testing and sampling operation according to the fluid characteristic.

18 Claims, 18 Drawing Sheets

(51) Int. Cl.
*E21B 49/08* (2006.01)
*E21B 47/06* (2012.01)
*G01V 99/00* (2009.01)

(52) U.S. Cl.
CPC ............ *E21B 47/102* (2013.01); *E21B 49/08* (2013.01); *G01V 99/005* (2013.01); *E21B 2049/085* (2013.01)

(56) References Cited

U.S. PATENT DOCUMENTS

| | | |
|---|---|---|
| 8,575,541 B1 | 11/2013 | Jamison et al. |
| 2002/0154315 A1 | 10/2002 | Myrick |
| 2005/0257611 A1 | 11/2005 | Fogal et al. |
| 2008/0125973 A1 | 5/2008 | Sherwood et al. |
| 2009/0182693 A1 | 7/2009 | Fulton et al. |
| 2011/0061439 A1* | 3/2011 | Dong ................... E21B 49/08 73/1.03 |
| 2011/0099132 A1* | 4/2011 | Fruehbauer ............ G01V 11/00 706/12 |
| 2011/0108720 A1 | 5/2011 | Ford et al. |
| 2013/0032736 A1 | 2/2013 | Tunheim et al. |
| 2013/0070235 A1 | 3/2013 | Chen et al. |
| 2013/0284901 A1* | 10/2013 | Freese ................... G01N 21/17 250/208.2 |
| 2013/0284904 A1* | 10/2013 | Freese ................... G01N 21/17 250/214 DC |
| 2014/0131101 A1 | 5/2014 | Coley et al. |
| 2014/0352953 A1* | 12/2014 | Gao ...................... E21B 43/128 166/250.15 |
| 2015/0369656 A1* | 12/2015 | Chen ..................... E21B 47/123 702/104 |
| 2016/0108728 A1 | 4/2016 | Freese et al. |
| 2016/0320527 A1* | 11/2016 | Chen ........................ E21B 7/00 |

* cited by examiner

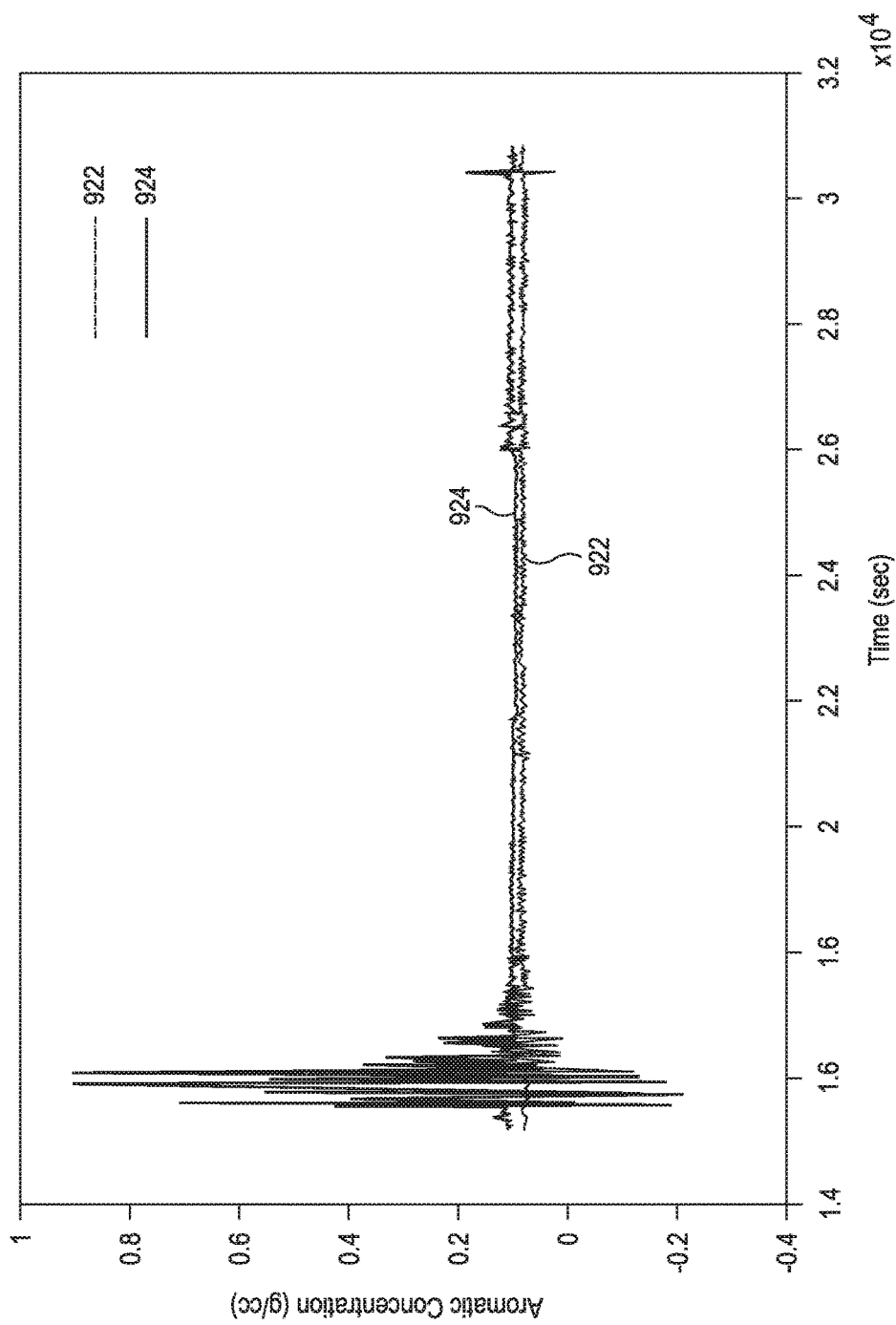

DUAL-SENSOR TOOL OPTICAL DATA PROCESSING THROUGH MASTER SENSOR STANDARDIZATION

BACKGROUND

Conventional multi-sensor downhole tools include two (or more) optical sensors, each of which is supported by its own signal standardization and fluid characterization algorithms (also called fluid models) for real-time optical fluid analysis. The fluid models are calibrated in a synthetic database and often require frequent updates with expansion of the database.

Frequent upgrades to the sensor design require frequent calibration and maintenance of the fluid models for each sensor. Further, with an increase in the number of downhole tools, calibrating and maintaining the optical sensors becomes costly and time consuming. In addition, since different optical parameters are selected as fluid model inputs for different optical sensors, additional efforts are required for interpreting data obtained from multi-sensor tools to evaluate whether the predictions by the two or more optical sensors regarding the fluid in the flow line are consistent with each other, or to confirm whether any inconsistencies in the predictions are because of using different fluid model inputs. To simplify data interpretation, current practice often chooses predictions from a single sensor as the basis of analysis, requiring further improvement to maximize the underlying value of the other sensor(s).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 9A-9D compare post-processed master sensor predictions of live density, methane concentration, saturate concentration and aromatics concentration, respectively, of a volatile oil sample obtained from a field job, using transformed optical inputs from the upper and lower operational sensors of a downhole tool.

DETAILED DESCRIPTION

Embodiments described herein relate to a method of processing and interpreting data obtained by a downhole tool having two optical sensors (also referred to as a dual-sensor optical tool) through master sensor standardization for downhole optical fluid analysis. The exemplary method may efficiently evaluate the quality of optical data transformation and the uncertainty of fluid model prediction, which are associated with fluid phase and contamination, by comparing dual-sensor predictions that are standardized to a single master sensor framework.

According to embodiments disclosed herein, the real-time measurements of each of the two optical sensors from any dual-sensor tool can be mapped into a single master sensor tool parameter space using a non-linear cross-sensor standardization algorithm. Then, a different cross-space data transformation algorithm can be applied to the master sensor that further converts previously mapped optical signals for each optical sensor from the tool parameter space to a synthetic parameter space for use with pre-calibrated fluid models. Thereafter, the candidate fluid models of the master sensor can be used to predict the fluid compositions and other properties from the transformed optical inputs of each operational sensor. Since the predictions from the dual-sensor optical tool data are compared over the fluid models with same inputs, the uncertainty of using sensor-dependent inputs may be reduced, and the results from the dual-sensor data processing may be used in conjunction with other measurements of testing and sampling system, such as densitometer, bubble point, fluid capacitance, and pumpout rate, to provide integrated solutions on quality data transformation and prediction associated with fluid phase and contamination.

The exemplary method may be used to reduce the cost of sensor calibration and data management for fluid characterization, and reduce the uncertainty of dual-sensor optical data interpretation.

Figure 1:
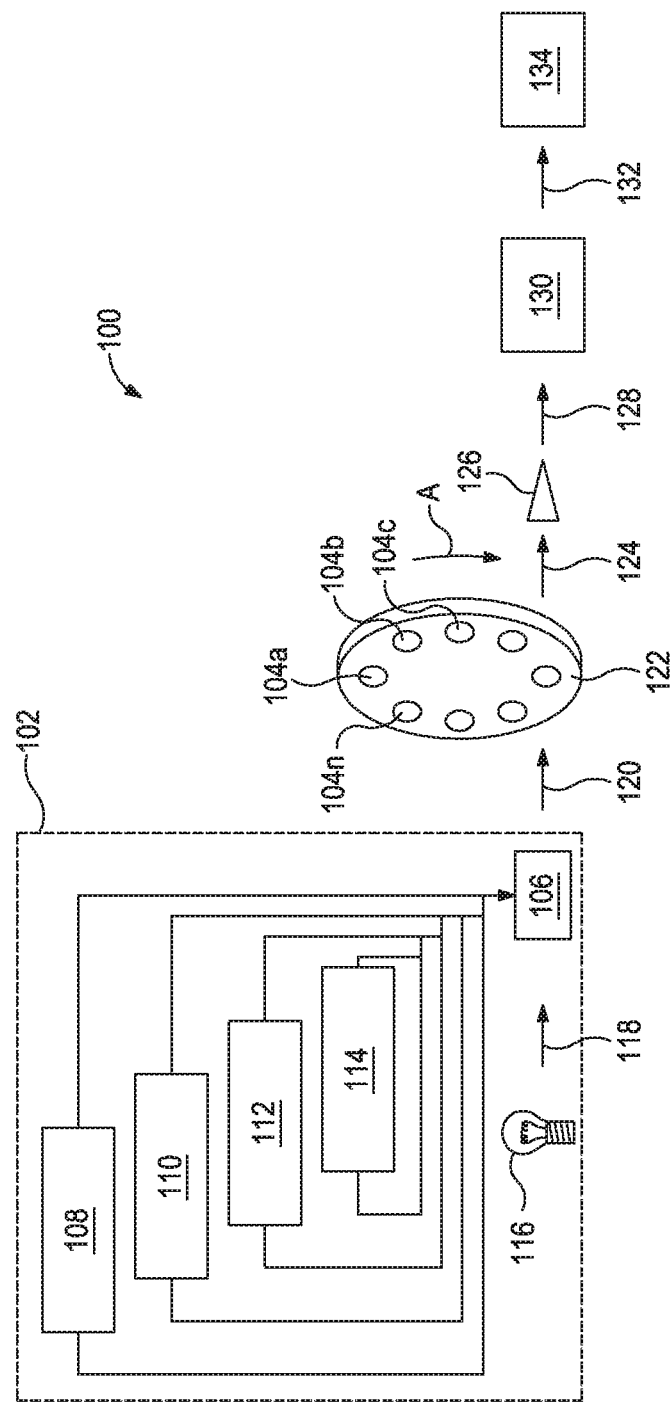
FIG. 1 illustrates a calibration system used to calibrate an optical sensor.

FIG. 1 illustrates an exemplary calibration system 100 that may be used to calibrate one or more optical elements used in an optical sensor. As illustrated, system 100 may include a measurement system 102 in optical communication with one or more optical sensors 104 (shown as 104a, 104b, 104c . . . 104n) that are to be calibrated. Each optical sensor 104a-n may include, without limitation, an optical band-pass filter or a multivariate optical element/integrated computational element (e.g., an ICE core). The measurement system 102 may circulate one or more reference fluids with different chemical compositions and properties (i.e., methane concentration, aromatics concentration, saturates concentration, Gas-Oil-Ratio—GOR—, and the like) through an optic cell 106 over widely varying calibration conditions of temperature, pressure, and density, such that optical transmission and/or reflection measurements of each reference fluid in conjunction with each optical element 104a-n may be made at such conditions.

The measurement system 102 may include an optical pressure-volume-temperature (PVT) instrument, and the reference fluids circulated in the measurement system 102 may include representative fluids commonly encountered in downhole applications. The system 100 may collect output signals from each optical element 104a-n for each specified reference fluid at varying calibration conditions. In some cases, the reference fluids may include representative fluids that are easy to operate for manufacturing calibration, such as dodecane, nitrogen, water, toluene, 1-5 pentanediol, and two liquid crude oils or fluids with no gas concentration (e.g., dead oil). The crude reservoir oils used as reference fluids may be, for example, global oil library 13 (or "GOL13"), and global oil library 33 (or "GOL33"). In other cases, the reference fluids may include samples of live oils mixed with dead oil and hydrocarbon gas, such as methane for example, and the samples of hydrocarbon gases and/or $CO_2$. Manufacturing calibration of the optical sensor may serve the need of detector output re-scaling or instrument standardization.

The measurement system 102 may vary each reference fluid over several set points spanning varying calibration conditions. To accomplish this, as illustrated, measurement system 102 may include a liquid charging system 108, a gas charging system 110, a temperature control system 112, and a pressure control system 114. The liquid charging system 108 injects reference fluids into the fluid circuit to introduce fluid varying perturbations such that calibrating the optical elements 104a-n will incorporate all the expected compounds found in the particular reference fluid. The gas charging system 110 may inject known gases (e.g., N2, $CO_2$, $H_2S$, methane, propane, ethane, butane, combinations thereof, and the like) into the circulating reference fluids. The temperature control system 112 may vary the temperature of the reference fluid to simulate several temperature set points that the optical elements 104a-n may encounter downhole. Lastly, the pressure control system 114 may vary the pressure of the reference fluid to simulate several pressure set points that the optical elements 104a-n may encounter downhole.

The optic cell 106 is fluidly coupled to each system 108, 110, 112, and 114 to allow the reference fluids to flow therethrough and recirculate back to each of the systems 108, 110, 112, and 114 in a continuous, closed-loop fluid circuit. While the reference fluid circulates through optic cell 106, a light source 116 emits electromagnetic radiation 118 that passes through optic cell 106 and the reference fluid flowing therethrough. As the electromagnetic radiation 118 passes through the optic cell 106 it optically interacts with the reference fluid and generates sample interacted light 120, which includes spectral data for the particular reference fluid circulating through the measurement system 102 at the given calibration conditions or set points. The sample interacted light 120 may be directed toward optical sensors 104a-n which, as illustrated, may be arranged or otherwise disposed on a sensor wheel 122 configured to rotate in the direction A. While shown as arranged in a single ring on the sensor wheel 122, optical sensors 104a-n may alternatively be arranged in two or more rings on the sensor wheel 122. According to embodiments disclosed herein, a typical downhole tool may include two sensor wheels 122 that may be separated by a predetermined distance (e.g., 1 meter) from each other. One of the two sensor wheels 122 may be referred to as an upper sensor wheel 122 and is located uphole from the other sensor wheel 122 which may be referred to as a lower sensor wheel 122. In the present disclosure, a sensor wheel 122 including optical sensors 104a-n may also be referred to as an operational sensor (OS) 122. Thus, the downhole tool may include an upper operational sensor 122 and a lower operational sensor 122.

During calibration, sensor wheel 122 may be rotated at a predetermined frequency such that each optical sensor 104a-n may optically interact with the sample interacted light 120 for a brief period and sequentially produce optically interacted light 124 that is conveyed to a detector 126. Detector 126 may be generally characterized as an optical transducer and may comprise, but is not limited to, a thermal detector (e.g., a thermopile), a photo-acoustic detector, a semiconductor detector, a piezo-electric detector, a charge coupled device (CCD) detector, a video or array detector, a split detector, a photon detector (e.g., a photomultiplier tube), photodiodes, and any combination thereof. Upon receiving individually-detected beams of optically interacted light 124 from each optical sensor 104a-n, detector 126 may generate or otherwise convey corresponding response signals 128 to a data acquisition system 130. A data acquisition system 130 may time multiplex each response signal 128 received from the detector 126 corresponding to each optical sensor 104a-n. A corresponding set of resulting output signals 132 is subsequently generated and conveyed to a data analysis system 134 for processing and providing input parameters for various fluid predictive models with use of outputs from each optical element 104a-n as a candidate variable.

Once sensor wheel 122 is calibrated, one or more calibrated sensor wheels 122 (or operational sensors 122) may then be installed on a downhole tool with other system components, for assembly validation testing. To validate the optical response of the sensor assembly, the sensor may be placed in an oven that regulates the ambient temperature and pressure. The reference fluids used to calibrate sensor wheel 122 may then be selectively circulated through the optical sensor at similar set points used to calibrate the optical sensors 104a-n. More particularly, the reference fluids may be circulated through the optical sensor at various set point downhole conditions (i.e., elevated pressures and temperatures) to obtain measured optical responses.

The optical sensors 104a-n are calibrated using the response of the sensors to reference fluids in a tool parameter space. On the other hand, fluid spectroscopic analysis and fluid predictive model calibration using a large amount of data in a standard oil library is performed in a synthetic parameter space (also called Optical-PVT data space). Synthetic sensor responses for each sensor in the downhole tool are calculated as a dot product of full-wavelength-range of fluid spectrometry and sensor element spectrum excited by a light source. The value of the dot product may vary nonlinearly or linearly compared to the actual sensor response due to the difference between the mathematical approximation used in calculating synthetic sensor response and the real system implementation. To compensate for the difference above, the measurement data from the sensors in the downhole tool can be transformed from the tool parameter space to the synthetic parameter space through a reverse transformation algorithm before applying fluid predictive models. In some embodiments, fluid predictive models are calibrated with different synthetic optical inputs, and saved in an optical fluid model base. This provides sufficient adaptability in dealing with data transformation uncertainty and improves the formation fluid compositional analysis and field data interpretation.

Figure 2:
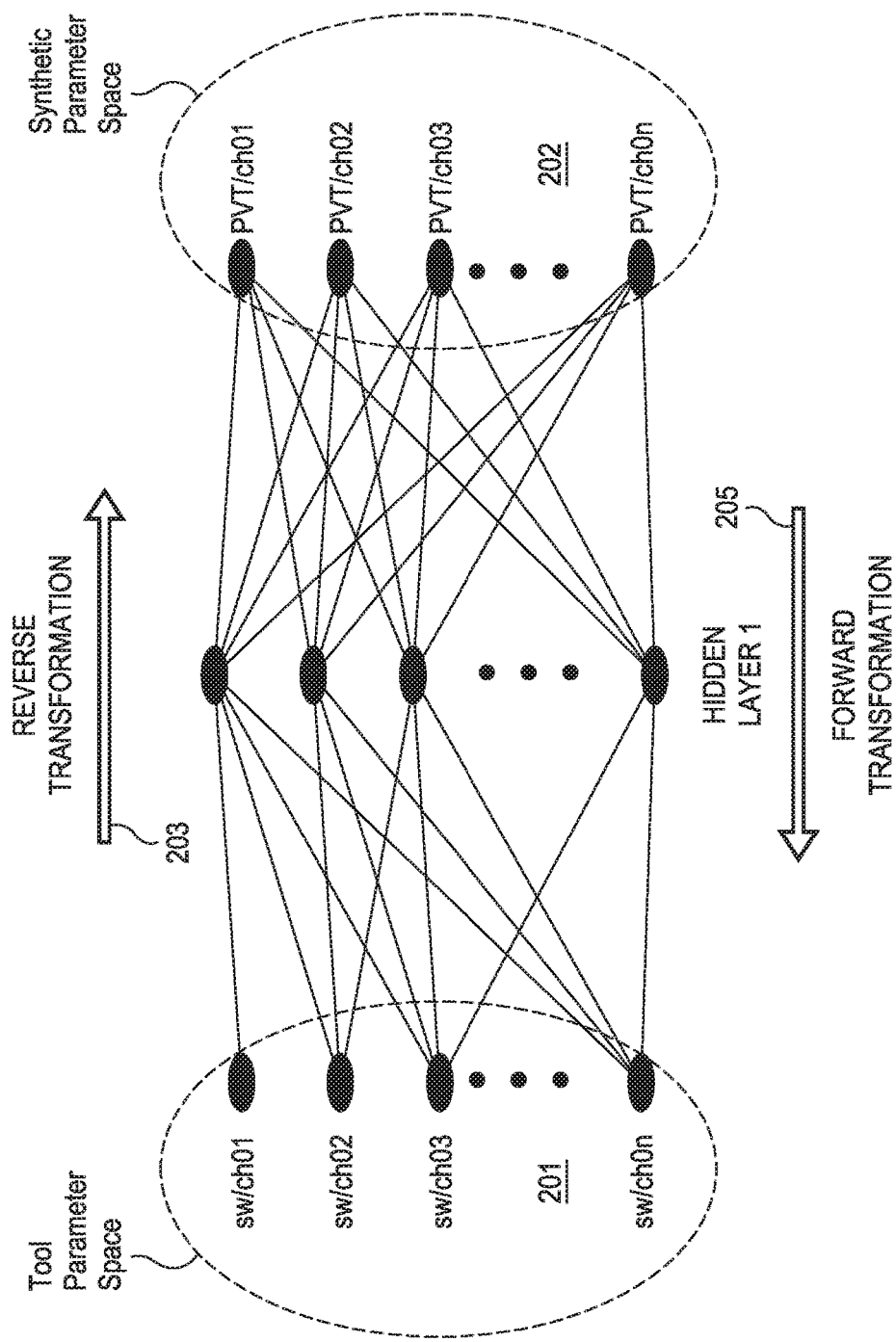
FIG. 2 illustrates a general transformation model framework including a forward transformation and a reverse transformation between a tool parameter space and a synthetic parameter space with neural networks.

In current practice, an optical fluid model is sensor dependent for each downhole tool used for measurement. An optical fluid model includes data transformation (i.e., standardization) models and property predictive models. To provide adequate flexibility for optical data processing and interpretation, an optical fluid model includes the following candidate constituents: transformation models calibrated on selected reference fluids through reverse transformation, transformation models calibrated on selected reference fluids through forward transformation, and predictive models calibrated on both Optical-PVT database and sensor wheel 122 data spaces. Depending on the data space in which the fluid property predictive models are calibrated, data transformation models convert measured or simulated optical sensor output between a tool parameter space and a synthetic parameter space. FIG. 2 illustrates one such transformation.

FIG. 2 illustrates an embodiment of a general transformation model framework including a forward transformation 205 and a reverse transformation 203 between data in a tool parameter space 201 and a synthetic parameter space 202 with a non-linear algorithm. In some embodiments, the non-linear algorithm used to implement reverse transformation 203 is a neural network model. In some embodiments the forward 205 and reverse transformation 203 includes a multi-input, multi-output neural network that may be applied by data analysis system 134 of FIG. 1 to optical responses. The model that converts the actual optical sensor response sensors (SW/Ch01-Ch0$n$) from tool parameter space 201 to synthetic parameter space 202 (PVT/Ch01-Ch0$n$) is reverse transformation 203. The model that converts data from synthetic parameter space 202 into tool parameter space 201 is forward transformation 205. Although the illustrated general transformation model framework in FIG. 2 is configured with multi-input/multi-output non-linear neural networks, there is no limitation in using other non-linear and linear transformation algorithms with single-input/single-output and multi-input/single-output configurations.

Figure 3:
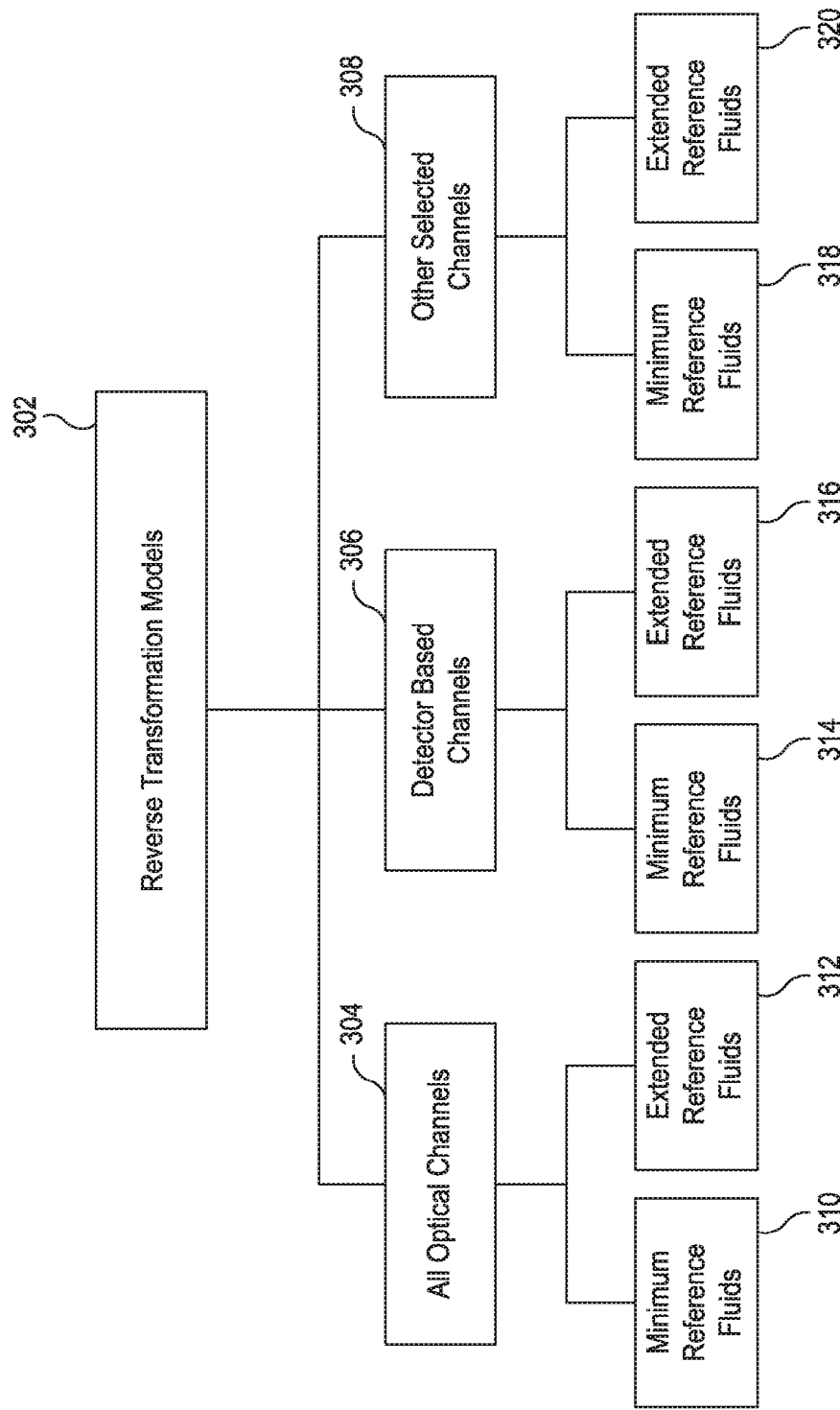
FIG. 3 depicts a hierarchical structure for reverse transformation models.

FIG. 3 illustrates an embodiment of a hierarchical structure for reverse transformation models 302. The variations of transformation models 302 may include converting optical sensors 304 for each optical sensor in a single model, converting the disjoined optical sensors in several detector-based models 306, or converting only selected sensors 308 of interest each time in different individual models. Compared to a single model implementation, multi-model options can improve the reliability of data construction in the output (i.e., transformed) parameter domain (e.g., synthetic parameter space 202, cf. FIG. 2) if one or more of the optical sensors (e.g., tool parameter space 201, cf. FIG. 2), as a transformation input, experience a problem. A plurality of reference fluid blocks 310-320, at the bottom of the hierarchical structure and coupled to the various sensors 304-308, represent the transformation models that can be built based on different reference fluids (e.g., minimum number of reference fluids 310, 314, 318 and extended reference fluids 312, 316, 320). The minimum number of reference fluids may refer to the seven representative fluids discussed above. These reference fluids are safe to use in a laboratory configuration and easy to clean for testing purposes. Optical sensor responses (e.g., tool parameter space 201) generally have a wide dynamic range as a representation of diverse fluids in an existing Optical-PVT database. Extended reference fluids often include one or more fluids such as live oil, natural gas, and/or gas condensates to cover a wider dynamic range and provide a more robust transformation model.

In some embodiments, reverse transformation 203 (FIG. 2) converts sensor measurements from tool parameter space 201 into synthetic parameter space 202 prior to applying fluid characterization models. Accordingly, fluid characterization models use data from synthetic parameter space 202 as input to obtain information such as fluid composition, and physical properties of the fluid. Forward transformation 205 (FIG. 2) can be used to convert a whole set of simulated optical sensor responses from synthetic parameter space 202 to tool parameter space 201 prior to developing predictive models on tool parameter space 201. As seen in FIG. 2, forward transformation 205 can be created by switching the input and the output of a neural network model. In other words, using a synthetic-sensor response as an input and a measured sensor wheel sensor response as an output, a neural network can then be trained to calibrate forward transformation algorithms.

As will be appreciated, a hierarchical structure for the reverse transformation models 302, as illustrated in FIG. 3, can also be applied to forward transformation models. After forward transformation 205 is developed, it can be used to convert the synthetic sensor responses of the global samples in synthetic parameter space 202 into tool parameter space 201. Then the fluid property predictive models can be calibrated in tool parameter space 201, and the further transformation is not needed in field data processing because measured optical responses from the sensor can be used as model inputs directly for fluid compositional analysis. Compared to the reverse transformation, which applies on-line sensor data conversion each time before making a fluid prediction, forward transformation usually only applies one time off-line to convert synthetic sensor responses for fluid prediction model development. However, reverse and forward transformations have different complexity with neural network implementation. Compared to reverse transformation, forward transformation may require a larger number of reference fluids for calibration, and consequently may induce higher uncertainty in fluid model development with use of transformed synthetic database. Therefore, reverse transformation is selected hereafter as general framework for cross-space transformation and used in conjunction with cross-sensor transformation described below for dual-sensor tool optical data processing.

Figures 4A, 4B, 4C:
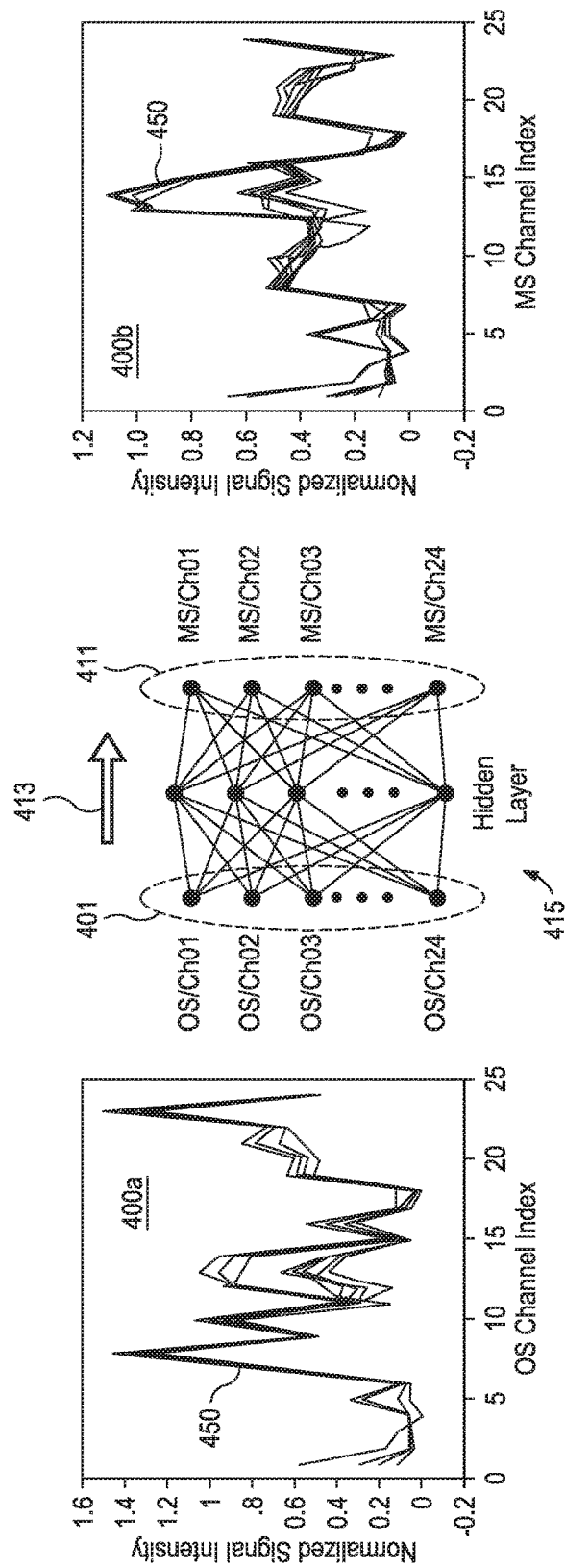
FIGS. 4A-4C illustrate a cross-sensor standardization modeling of sensor data in tool parameter space between an operational sensor (OS) data and a master sensor (MS) data for a field set from fluids measured by a downhole tool.

FIGS. 4A-4C illustrate a cross-sensor transformation of sensor data in tool parameter space from an operational sensor (OS) data 400$a$ to a master sensor (MS) data 400$b$ for a field set 450 from fluids measured by the dual-sensor downhole tool. The operational sensor (OS) data 400$a$ may be tool parameter space data from either the upper operational sensor 122 or the lower operational sensor 122 installed on the dual-sensor downhole tool deployed in a field application, whereas the master sensor (MS) data 400$b$ may be tool parameter space data from a master sensor. Without loss of generality, a total of twenty four sensor elements or channels 401 are used to collect operational sensor (OS) data 400$a$ and twenty four sensor elements or channels 411 are used in the master sensor (MS) data 400$b$. In some embodiments, the twenty four sensor elements in each of the upper and lower operational sensors, and the master sensor may include ICE elements and narrow band-pass (NBP) filters, among other optical elements.

In an embodiment, the optical sensor configuration and ICE design of the twenty four sensor elements in operational sensor data 400a may be different from that of the twenty four sensor elements in master sensor data 400b. For example, data in channel 1 of operational sensor data 400a may be associated with a methane ICE fabricated according to a first design, and a corresponding data in channel 1 of master sensor data 400b may be associated with a methane ICE fabricated according to a second design. Accordingly, the first design may include a first number of alternating dielectric layers, each of the layers having a specific thickness determined according to the first design, and the second design may include a second number of alternating dielectric layers, each of the layers having a specific thickness determined according to the second design. In some embodiments, sensor elements 401 may include at least one NBP in the ultra-violet (UV)-visible wavelength domain (approximately from 400 nm to 750 nm), whereas sensor elements 411 may include at least one NBP in the near-infrared (NIR) wavelength domain (approximately from 750 nm to 2500 nm). In another embodiment, the upper and lower operational sensors 122 may each have a different configuration and design. For instance, the upper operational sensor may include ICE elements while the lower operational sensor 122 may include NBP filters.

FIG. 4A depicts operational sensor data 400a that shows optical responses obtained by the twenty four optical sensor elements (or channels) 401 of either the upper or lower operational sensor 122. Accordingly, the data illustrated in FIG. 4A may be obtained from fluids measured in the wellbore by the dual-sensor downhole tool including the upper and lower operational sensors. The abscissae in FIG. 4A include integers indicative of each of the twenty four optical sensor elements (or channels) 401 in one of the upper or lower operational sensor, and the ordinate indicates a value (intensity) for the signal produced by each optical sensor element 401. The value for the signal of each optical sensor element 401 may include a normalized voltage proportional to an intensity of an interacted light received in a detector from each optical sensor element 401. Accordingly, each trace having twenty four data points in FIG. 4A corresponds to a wellbore fluid measured by any one of the upper or lower operational sensor 122 of the downhole tool using respective optical sensor elements 401.

FIG. 4B depicts master sensor data 400b obtained by cross-sensor transformation 413 of the operational sensor data 400a using a multi-input, multi-output neural network transformation algorithm 415. The neural network transformation algorithm 415 is pre-calibrated on the selected reference fluids which includes, but are not limited to, petroleum representative samples of dead oil, live oil, natural gas and/or gas condensates, water, and nitrogen for generalized training, and other featured fluids such as toluene, pentanedioal, and dodecane to ensure adequate parameter range of optical response for each sensor element. The optical sensor responses used as calibration inputs and outputs for calibrating cross-sensor standardization algorithm are obtained from lab testing and/or simulation analysis at matched temperatures and pressures. The calibration data may be pre-processed with baseline correction, normalization, and may include other calibration inputs, such as temperature and pressure. Neural network transformation algorithm can also be optimized for quality data mapping through training by adjusting the number of neurons or nodes on hidden layer (as shown in FIG. 4C), applying regularized training algorithm, and using ensemble predictor with transformation outputs averaged over more than one member networks. The abscissae in FIG. 4B includes integers indicative of each of the twenty four optical sensor elements 411 in the master sensor, and the ordinate indicates a value for the signal produced by each optical element 411. It should be noted that a real, physical master sensor is used during the calibration, and calibration inputs from operational sensors and outputs from master sensor are generally pre-processed with same procedure or software routine. The value for the signal of each optical element 411 may include a normalized voltage proportional to an intensity of an interacted light received in a detector from each optical element 411. Accordingly, each trace having twenty four data points in FIG. 4B corresponds to the reference fluids as measured by the master sensor during calibration. In downhole application, however, operational sensors are the only sensors installed on the downhole optical tool, and the master sensor could be a 'virtual' sensor used for data processing. In this case, each trace corresponds to the wellbore fluid as it would have been measured by the master sensor had the master sensor been used in the downhole tool instead of the upper and lower operational sensors 122.

FIG. 4C shows a cross-sensor transformation 413 of operational sensor data 400a from optical sensor 401 in one of the upper and lower sensors 122, to master sensor data 400b. As will be understood, the cross-sensor transformation 413 standardizes the operational sensor data 400a. In some embodiments, cross-sensor transformation 413 applied in tool parameter space is a non-linear mapping such as a multi-input, multi-output neural network (NN) algorithm. The NN algorithm is typically implemented with an input layer, a hidden layer 415, and an output layer. The input layer receives transformation inputs from operational sensors 401. The hidden layer has a number of hidden neurons or nodes as adjustable computing elements. Each element is equipped with a nonlinear hyperbolic tangent sigmoid or logarithmic sigmoid transfer function to process the weighted combinational data from the input layer according to the specified transfer function. The output layer is assigned with same number of optical sensor elements 411 as the master sensor. The output of each element 411 on the output layer is a weighted linear combination of hidden neuron outputs on the hidden layer.

Figures 5A, 5B, 5C:
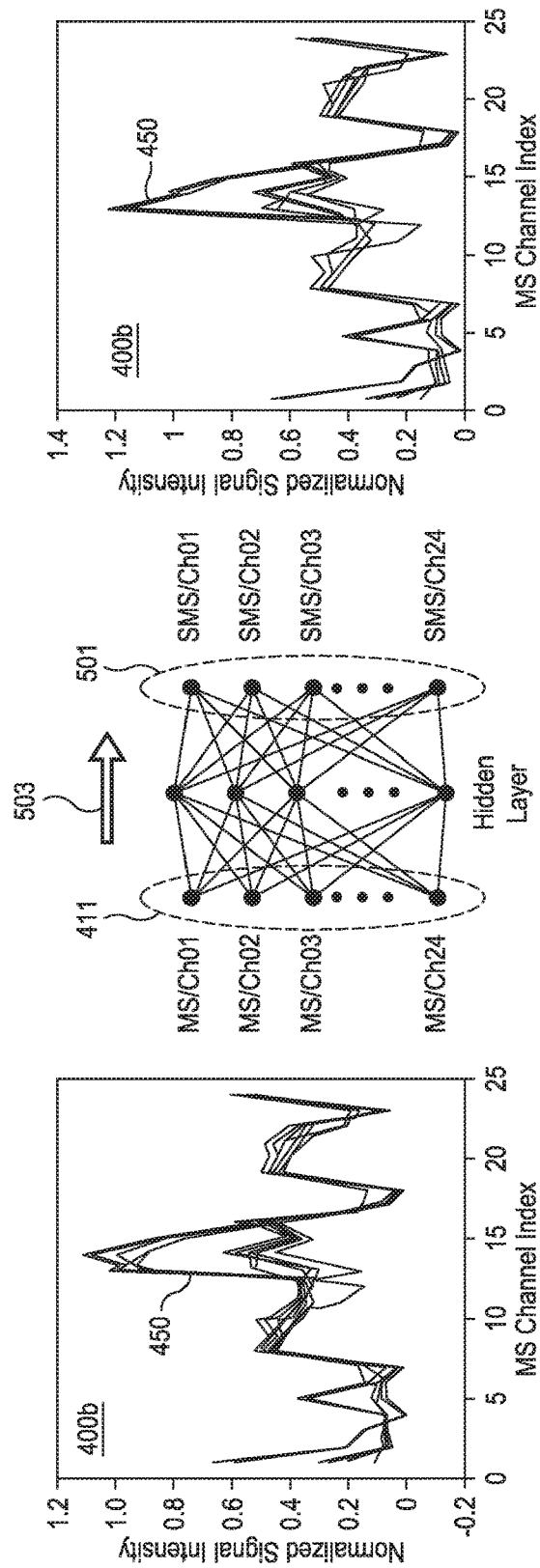
FIGS. 5A-5C illustrate a transformation from standardized master sensor data in tool parameter space of the master sensor to a synthetic parameter space (SMS) of the master sensor.

FIGS. 5A-5C illustrate a transformation 503 from standardized master sensor data 400b in tool parameter space of the master sensor to a synthetic parameter space (SMS) of the master sensor. As illustrated, twenty four sensor elements or channels 411 are used in the master sensor (MS) data 400b as inputs and produce twenty four sensor elements or channels (SMS) 501 of the master sensor in the synthetic parameter space of the master sensor. The transformation 503 uses a cross-space or reverse transformation algorithm of the master sensor. The master sensor cross-space transformation algorithm is pre-calibrated on the same reference fluids with neural networks to convert the master sensor responses from the tool parameter space to the synthetic parameter space. As calibration outputs, the synthetic optical responses of the master sensor are calculated as a dot product of spectroscopy data of reference fluids and spectra of optical sensor elements over the same wavelength range and measured at elevated and specified temperatures and pressures, followed by baseline correction and neutral density normalization. As mentioned above, the abscissae in FIG. 5A includes integers indicative of each of the twenty four optical sensor elements 411 in the master sensor, and the ordinate indicates a value for the signal produced by each optical element 411. The abscissae in FIG. 5B includes integers indicative of each of the twenty four optical sensor elements in the master sensor, and the ordinate indicates a value for the synthetic signal expected from each optical element 411 compatible to the inputs of a fluid model.

FIG. 5C includes transformation 503 performing a cross-space transformation algorithm, which can be a nonlinear transformation algorithm such as a neural network with same architecture as specified in FIG. 4C. In embodiments consistent with the present disclosure, transformation 503 is applied at a second concatenation stage of neural network processing that maps data from the tool parameter space of the master sensor to the synthetic parameter space of the master sensor. Accordingly, concatenating transformation 413 with transformation 503 may enable a robust workflow for downhole optical tool data processing from operational sensor to master sensor.

In some embodiments, transformation 413 can also be used as a non-linear filter to generate smooth optical inputs for transformation 503. Because transformation 413 is equipped with hyperbolic tangent sigmoid or logarithmic sigmoid transfer function, the output of each hidden node can be confined to a reasonable range in de-spiking signals on transformation output even the optical sensor inputs are substantially out of the calibration range, especially for mud-filtrate corrupted data. This feature of embodiments consistent with the present disclosure enhances data processing for fluid model validation analysis.

Figure 6:
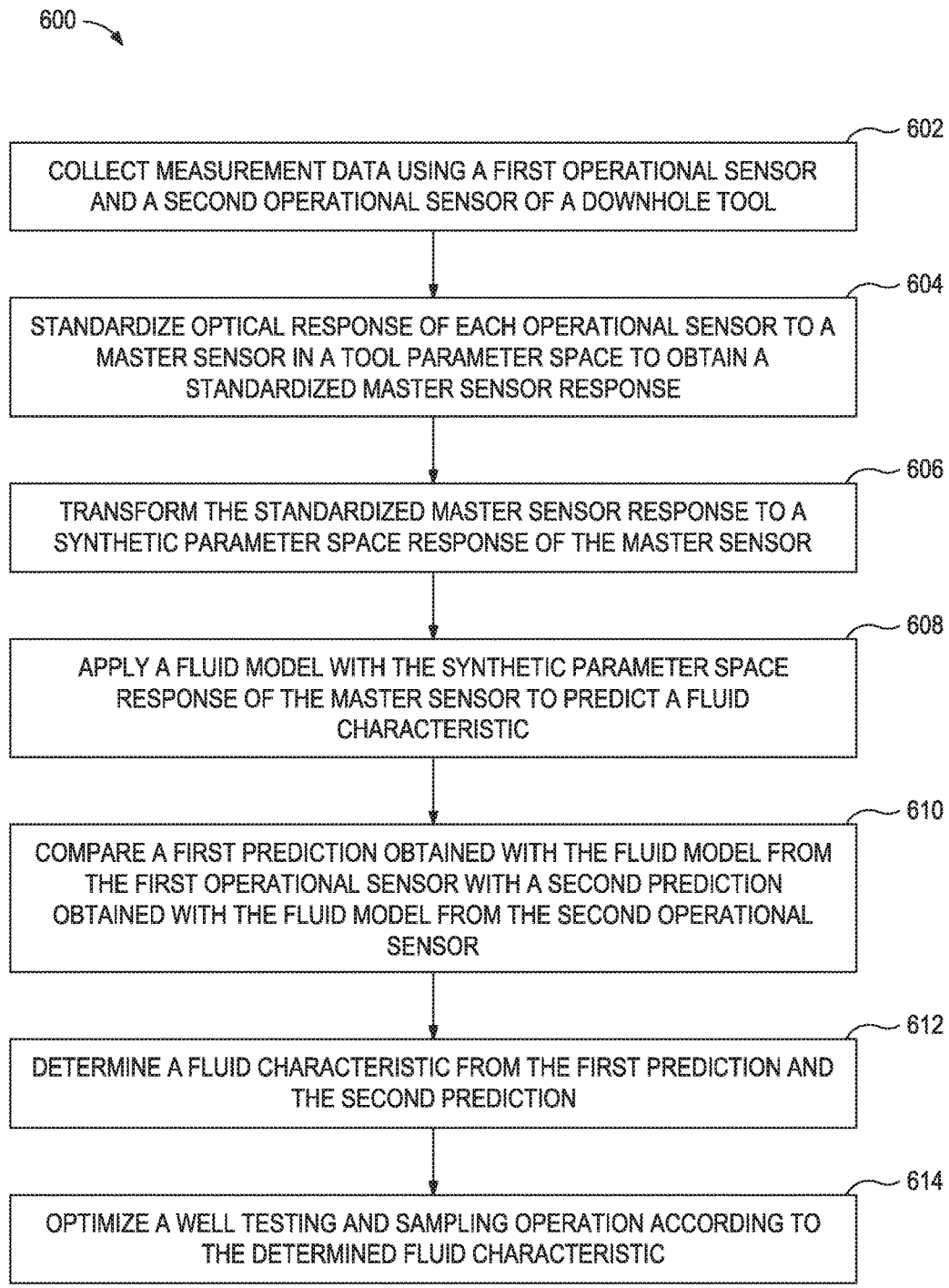
FIG. 6 is a flowchart of a method for dual sensor optical tool data processing through master sensor standardization.

FIG. 6 is a flowchart of a method 600 for dual sensor optical tool data processing through master sensor standardization. It should be noted that methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

The method 600 may include collecting measurement data using a first operational sensor and a second operational sensor of a downhole tool, as at 602. As mentioned above, the downhole tool may include two or more operational sensors 122 installed on the upper and lower positions (cf. FIG. 1). In some embodiments, the two operational sensors 122 on each downhole tool may have same number of optical elements, such as ICEs and NBP filters, with same designs. In other embodiments, the two operational sensors 122 may have different number of optical elements with different designs.

The method 600 may then standardize optical responses of each operational sensor to a master sensor in a tool parameter space to obtain a standardized master sensor response, as at 604. In some embodiments, the operational sensors and the master sensor may have same configuration and element design. In other embodiments, the operational sensors and the master sensor may have different configurations and element designs. The cross-sensor standardization is performed in tool parameter space to convert operational sensor responses to master sensor responses by using multi-input, multi-output neural network transformation algorithm. The neural network standardization algorithm is pre-calibrated on the selected reference fluids which includes, but are not limited to, petroleum representative samples of dead oil (e.g., oil at sufficiently low pressure that it contains no dissolved gas or a relatively thick oil or residue that has lost its volatile components), live oil (e.g., oil containing dissolved gas in solution that may be released from solution at surface conditions), natural gas, water, and nitrogen for generalized training; and other featured fluids such as toluene, pentanedioal, and dodecane to ensure adequate parameter range of optical response for each sensor element. The optical responses of the operational and master sensor pairs for calibrating standardization algorithm are obtained from lab testing and/or simulation analysis at matched temperatures and pressures. The calibration data can be pre-processed with baseline correction, normalization and other environmental correction, and neural network standardization algorithm can be optimized to adequate complexity for quality data mapping.

Further, the method 600 may include transforming the standardized master sensor response to a synthetic parameter space response of the master sensor, as at 606. The master sensor cross-space transformation algorithm is pre-calibrated on the same reference fluids with neural networks to covert the master sensor responses from the tool parameter space to the synthetic parameter space. The synthetic optical responses of the master sensor may be calculated as a dot product of spectroscopy data of reference fluids and spectra of sensor elements over the same wavelength range and measured at elevated and specified temperatures and pressures, followed by baseline correction and neutral density normalization prior to calibration.

The method 600 may then apply a fluid model with the synthetic parameter space response of the master sensor to predict a fluid characteristic, as at 608. Applying a fluid model may include testing one or more analyte-specific candidate models with different inputs transformed from each operational sensor respectively for each analyte prediction. The fluid model are pre-calibrated with a plurality of nonlinear multi-input, single-output neural networks or linear partial least square (PLS) algorithms in synthetic parameter space on a large number of fluid samples from a standard oil library, using synthetic master sensor responses as candidate calibration inputs, and measured fluid compositions and properties as calibration outputs. In an embodiment, the method may include applying a plurality of candidate fluid models with different candidate inputs for each fluid analyte or property prediction. The inputs to the candidate models can be determined from an automatic selection algorithm such as backward stepwise input selection or forward stepwise input selection.

The method 600 may then compare a first prediction obtained with the fluid model from the first operational sensor with a second prediction obtained with the fluid model from the second operational sensor, as at 610. Evaluating the predictions may include determining the matched predictions with same inputs for single phase fluid, determining the variation of predictions for multi-phase fluid, and estimating fluid contamination with presence of oil-based mud filtrate. The fluid phase in a flow line may be determined by comparing the difference in optical responses recorded by the first and second operational sensors, and examining other measurements of testing and sampling system, such as densitometer, bubble point, fluid capacitance, and pumpout rate. Optimizing the data interpretation may use real-time processing or post-processing routines and include synchronizing the predictions, adjusting fluid model selection, and providing self-consistent estimation based on predictions from either one of the operational sensors or from both the first and second operational sensors. Further, the method 600 may determine a fluid characteristic from the first prediction and the second prediction, as at 612, and optimize a well testing and sampling operation according to the fluid characteristic, as at 614.

Figure 7:
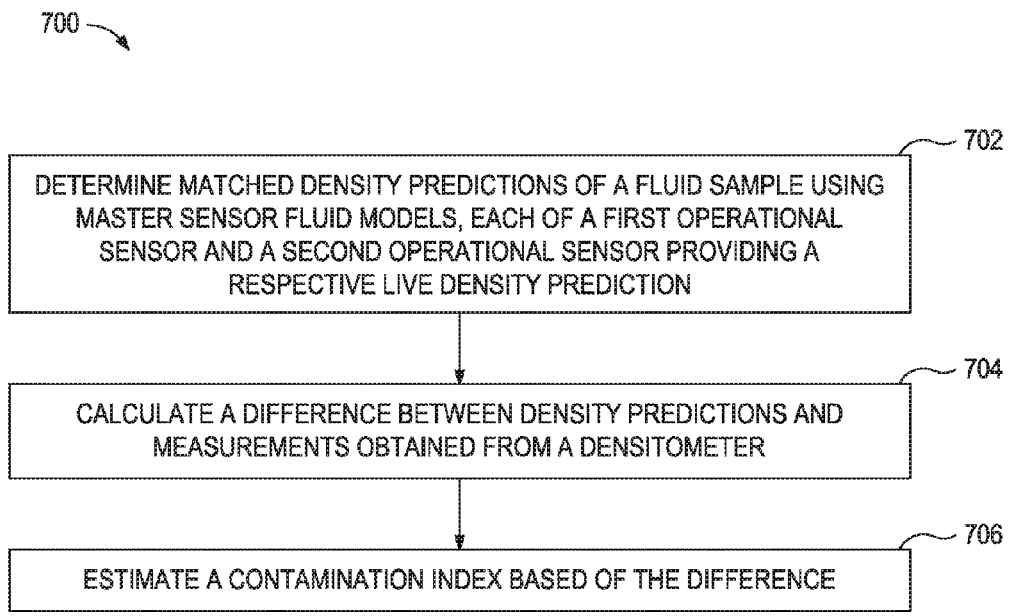
FIG. 7 is a flowchart of a method for estimating a contamination index of a live oil sample.

FIG. 7 is a flowchart of a method 700 for estimating a contamination index of a live oil sample. It should be noted that methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

The method 700 may determine matched density predictions of a fluid sample using master sensor fluid models, as at 702. Each of a first operational sensor and a second operational sensor may provide a respective live density prediction. The method 700 may then calculate a difference between density predictions and measurements obtained from a densitometer, as at 704, and estimate a contamination index based on the difference, as at 706. Herein, the live density prediction is a density prediction of the fluid sample including one or more dissolved gases.

Figure 8A:
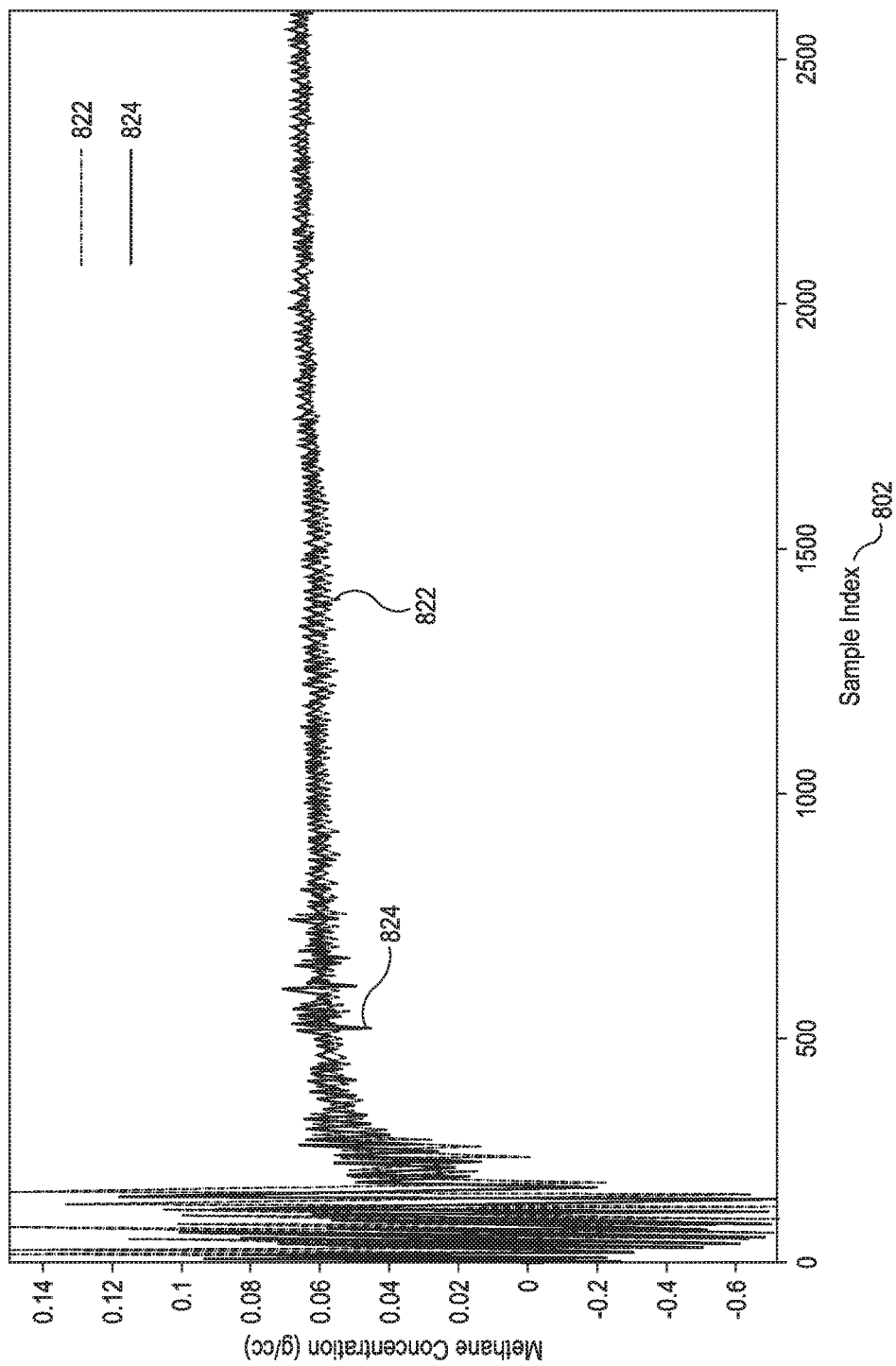
FIGS. 8A-8D compare results of post-processed fluid predictions regarding methane concentration, live density, gas/oil ratio, and resin concentration, respectively, of a medium oil sample using conventional individual-sensor based fluid models and the master-sensor based fluid models.
Figure 8B:
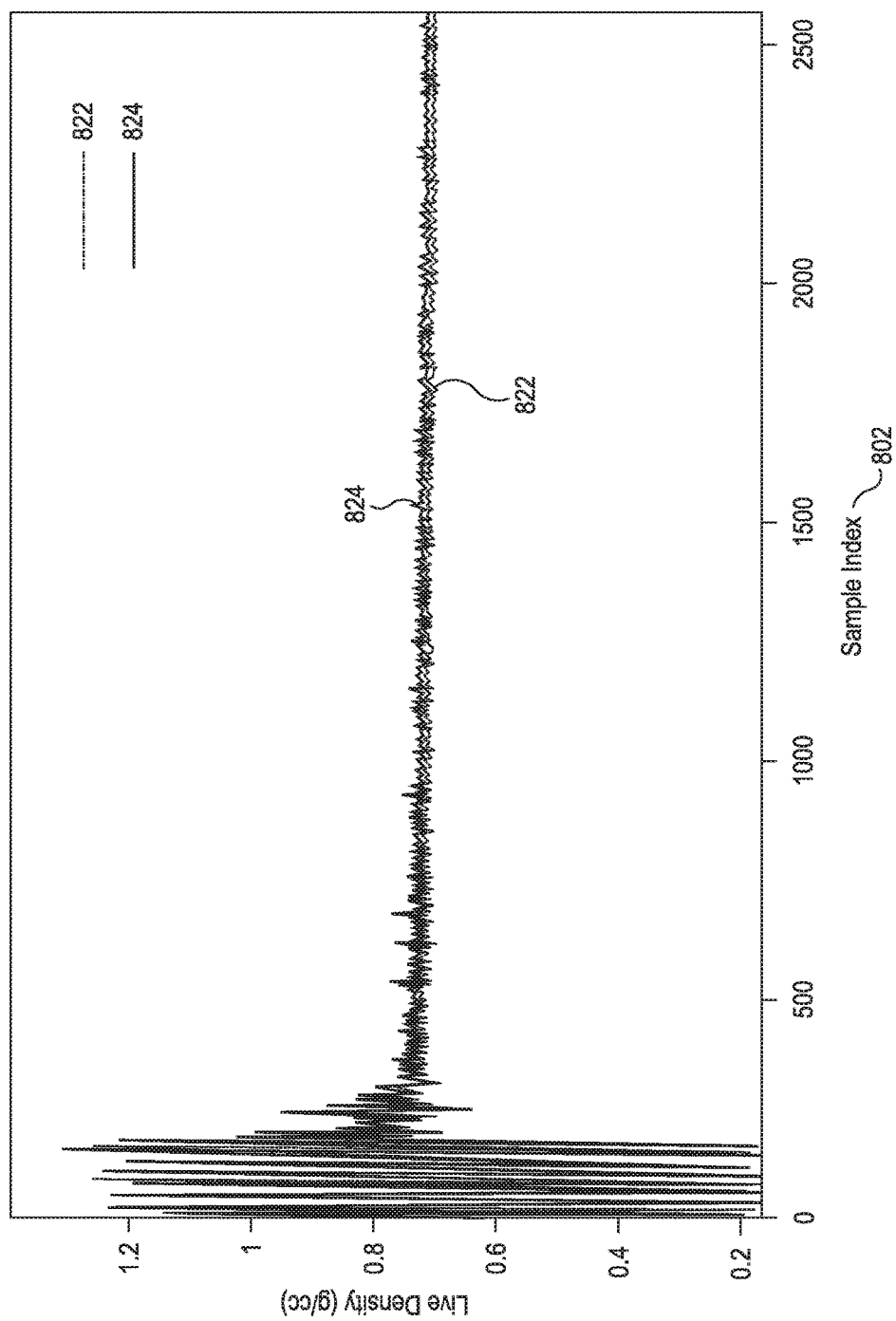
Figure 8C:
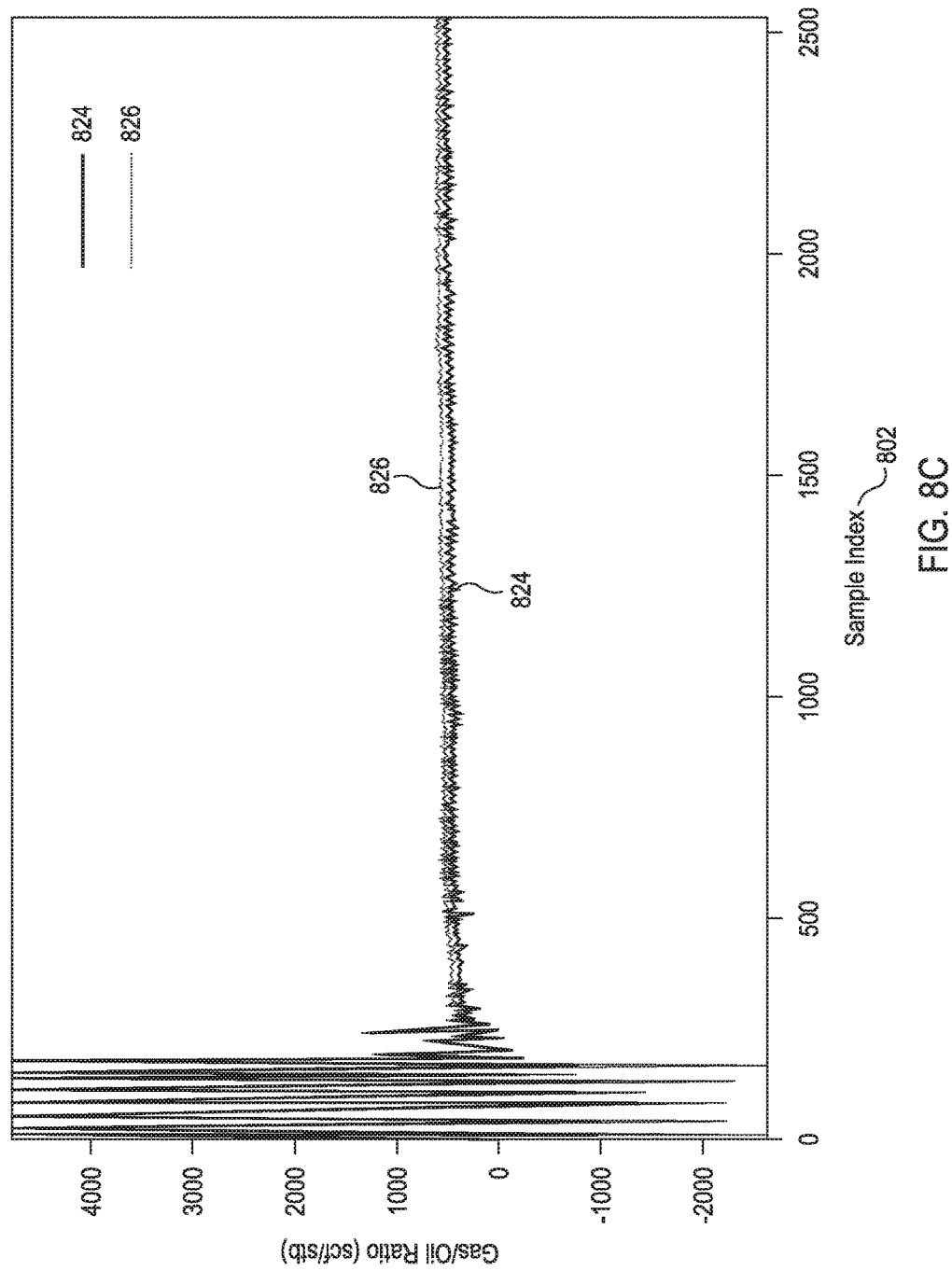
Figure 8D:
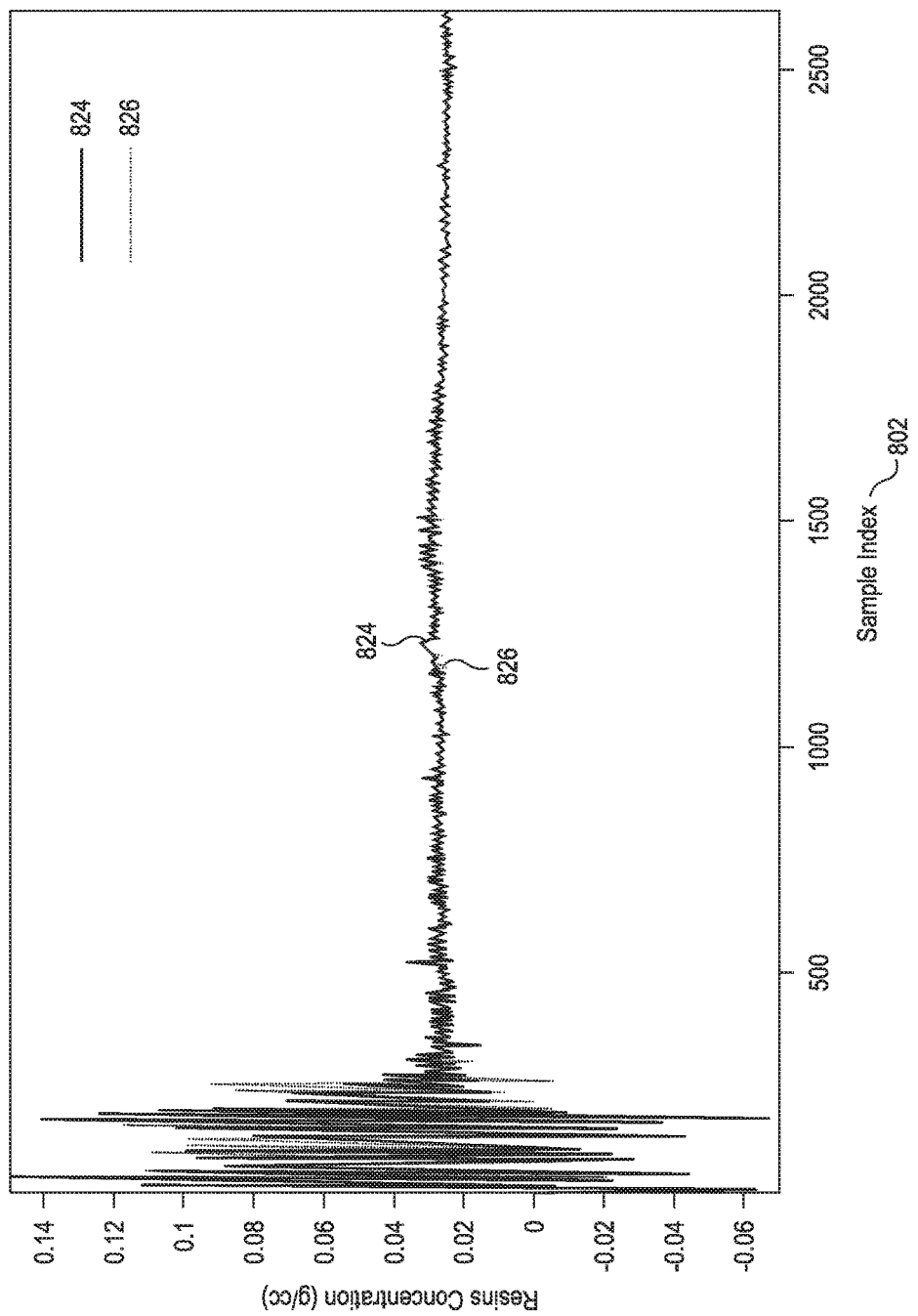

FIGS. 8A-8D compare results of post-processed fluid predictions regarding methane concentration, live density, gas/oil ratio and resin concentration, respectively, of a medium oil sample using conventional individual-sensor based fluid models and the master-sensor based fluid models with neural networks according to embodiments disclosed. The horizontal coordinate represents the sample index 802 of a measurement sequence from a field job. The vertical coordinate represents the fluid property measured in appropriate measurement units. FIG. 8A compares the results of a methane concentration prediction as carried out using conventional individual-sensor based fluid models and the master-sensor based fluid models with neural networks according to embodiments disclosed. The curve 822 indicates the prediction provided using conventional fluid models from an upper operational sensor of a downhole tool and the curve 824 represents the prediction provided using the master sensor models through cross-sensor standardization. As a statistical comparison, prediction in each case is an arithmetic average over multiple candidate fluid models with different inputs calibrated in synthetic parameter space of optical sensor on a standard oil library database. FIG. 8B compares the results on live density prediction between the upper operational sensor and the master sensor. FIG. 8C compares the results on gas/oil ratio prediction between a lower operational sensor of the downhole tool and the master sensor. In FIG. 8C, the curve 826 represents the prediction provided using fluid models from the lower operational sensor of the same downhole tool used in FIGS. 8A-8B, and the curve 824 represents the prediction provided from the master sensor models by using standardized data inputs from the lower operational sensor. FIG. 8D compares results on resins prediction between the lower operational sensor and the master sensor.

It may be seen from FIGS. 8A-8D that predictions by applying conventional individual sensor based fluid models and master sensor based fluid models have good agreement with each other. Because optical tool data processing through master sensor standardization may only require a single set of fluid models (namely, the set corresponding to the master sensor calibration) regardless of types of operational sensors used in the downhole tool, cost savings in fluid model calibration can be achieved using the exemplary method. Further, because of a reduction in the number of fluid models used, updating and maintaining the optical sensor model base would become more convenient and efficient. It should be noted from FIGS. 8A-8D that the initial optical sensor responses (e.g., sampling index less than 500) are out of calibration range of the fluid models due to contamination of oil-based mud filtrates, and may thus be ignored in common practice. However, as the operation continues, the sampling gradually approaches to stabilization, and predictions from optical responses are in close agreement with each other, indicating that operational sensor based fluid model calibration can be replaced by master sensor based calibration with equivalent quality in estimating fluid properties and reduced cost.

FIGS. 9A-9D compare post-processed master sensor predictions of live density, methane concentration, saturate concentration and aromatics concentration of a volatile oil sample obtained from a field job, using transformed optical inputs from the upper operational sensor and lower operational sensor of a downhole tool. The predictions from both operational sensors are synchronized to a time series to better compare the predictions obtained with the two sensors.

Figure 9A:
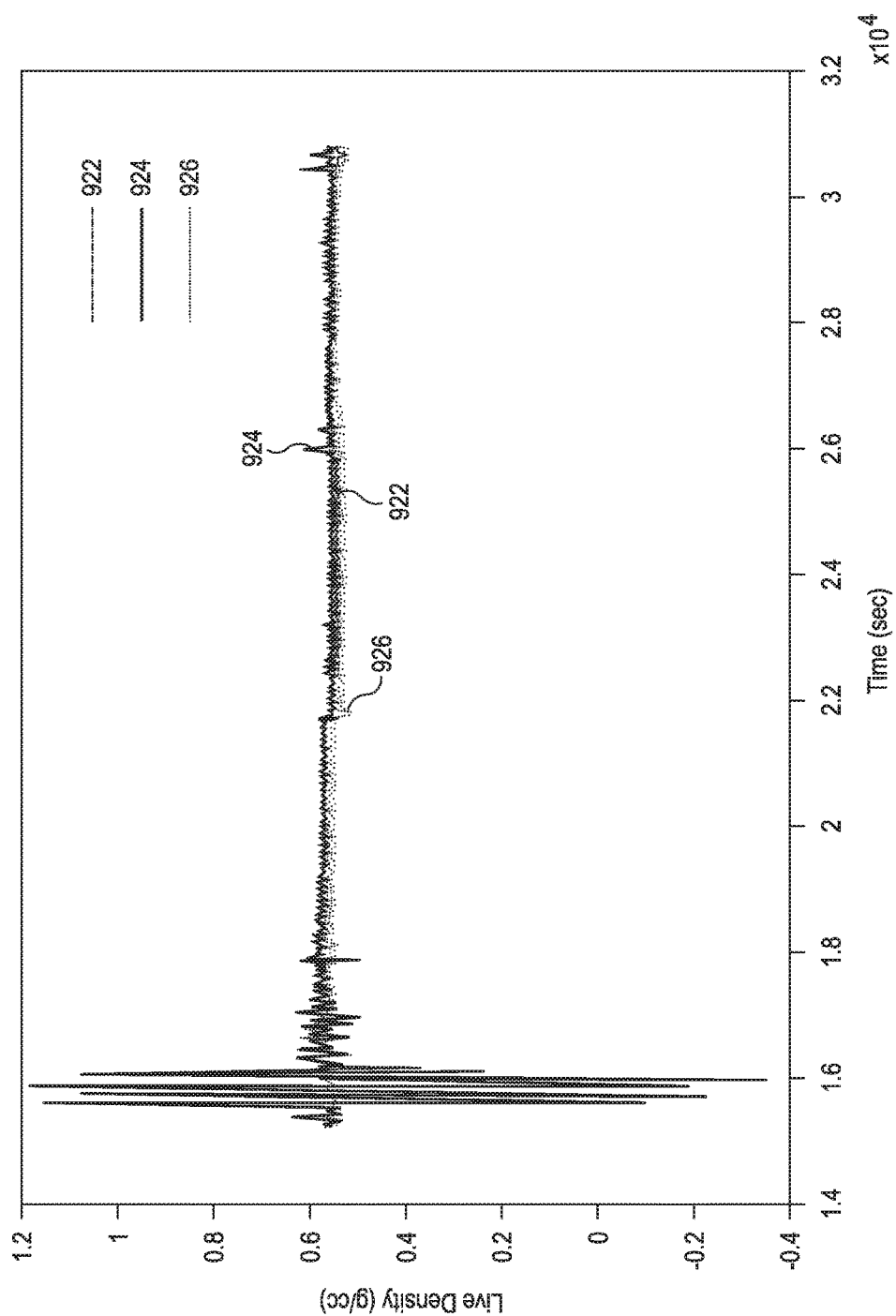

FIG. 9A illustrates sample graphs showing results of live density predictions using the exemplary method and associated application in real-time fluid contamination analysis. It should be noted that the illustrated live density predictions are with respect to live density of formation fluids, such as love oil density, live gas density, and live condensate density. Live density is typically estimated/predicted from optical inputs. It is also used to distinguish the reference fluid density measured with a densitometer sensor as described below. Fluid contamination analysis is crucial during well testing and sampling operation in collecting clean or near-clean oil samples with minimized mud-filtrate contamination. As a cost-effective approach, fluid density is often used to determine contamination index for real-time data analysis. In FIG. 9A, the live density predictions from each of lower and upper operational sensors (curves 922 and 924, respectively) of a downhole tool using the same optical inputs have been compared against the densitometer measurements (curve 926) taken from the same field job. Densitometer is an additional tube-vibration based sensor for measuring flow line fluid density and is often used in conjunction with optical sensor measurements to characterize downhole fluid properties. However, since the densitometer sensor has limitations in distinguishing the density of oil-based mud (OBM) and the density of oil, its application in fluid contamination analysis is not straightforward, and usually requires complex modeling and longer sampling time. In contrast, the live density predicted from each of the upper and the lower operational sensors is more sensitive to the variation of OBM related fluid contamination. As a result, in an embodiment, the difference between densitometer measurement and live density prediction may be used as a contamination index for OBM related field test. It may be observed from FIG. 9A that, during early stages of analysis in which significant OBM filtrate is present, a large difference may be observed between the measurements from the operational sensors and the densitometer measurements (cf. abscissae in FIG. 9A for t<18000 secs.). The difference, however, becomes smaller and eventually reduces to near zero during later stages of analysis, for example, at about 29000 seconds, at which relatively contamination-free fluid samples may be obtained. Using the master sensor fluid models for live density prediction, it is possible to process existing field data with different optical tools, and incorporate live density prediction with available densitometer measurements and other information and/or lab results through data-driven modeling for general contamination analysis.

Figure 9B:
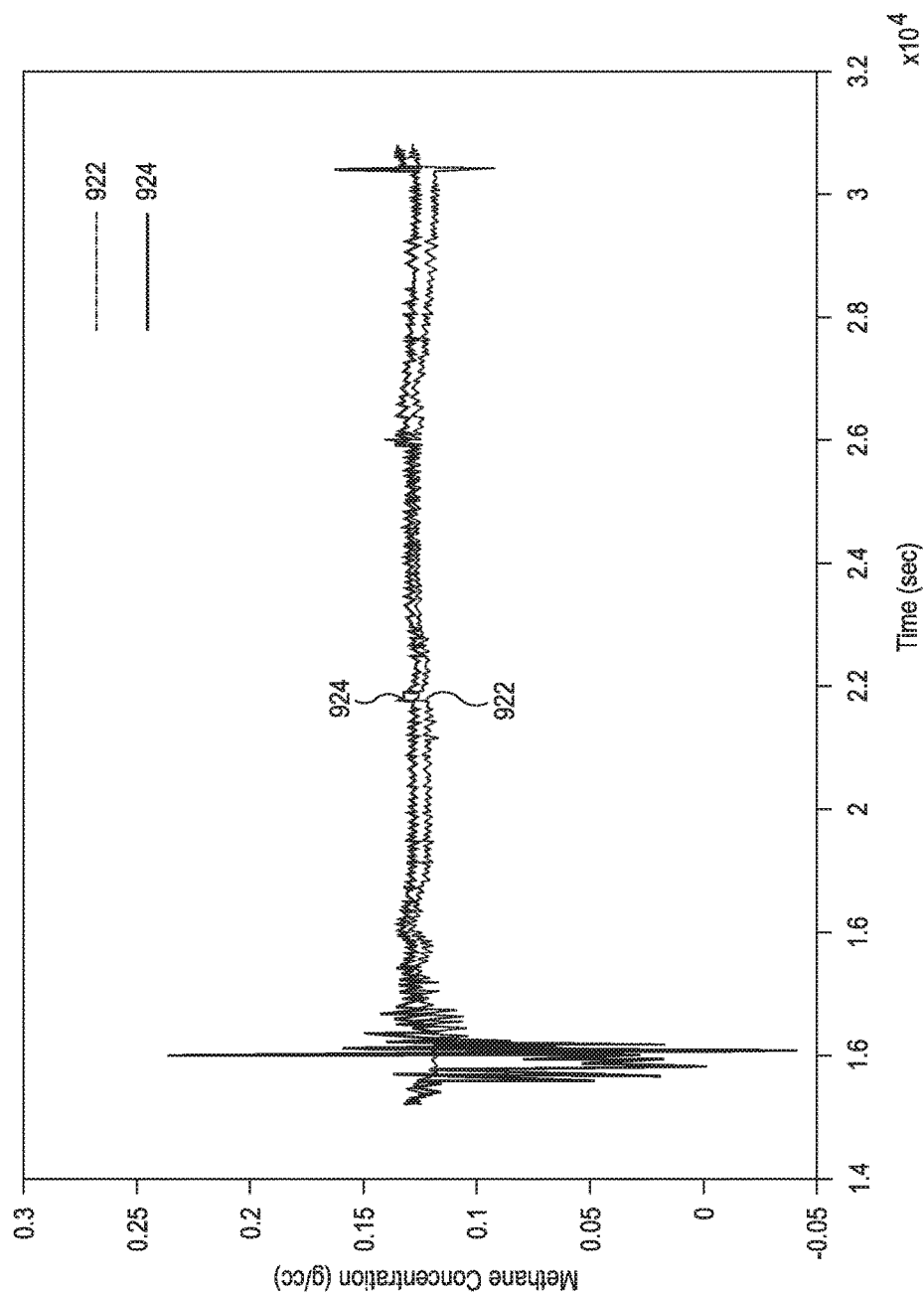

FIG. 9B illustrates a sample graph showing results of matched prediction on methane concentration. The difference between the methane concentration as predicted by the upper and lower operational sensors can be used to estimate the uncertainty of cross-sensor standardization, which may be induced by calibration error of the standardization algorithm and/or optical sensor signal variation after calibration. The inconsistency of master sensor predictions using transformed optical responses of upper and lower operational sensors may also indicate multiphase status in flowing line when sensing elements in different sensors record signal variations in synchronized time constants due to dynamic system responses.

Figure 9C:
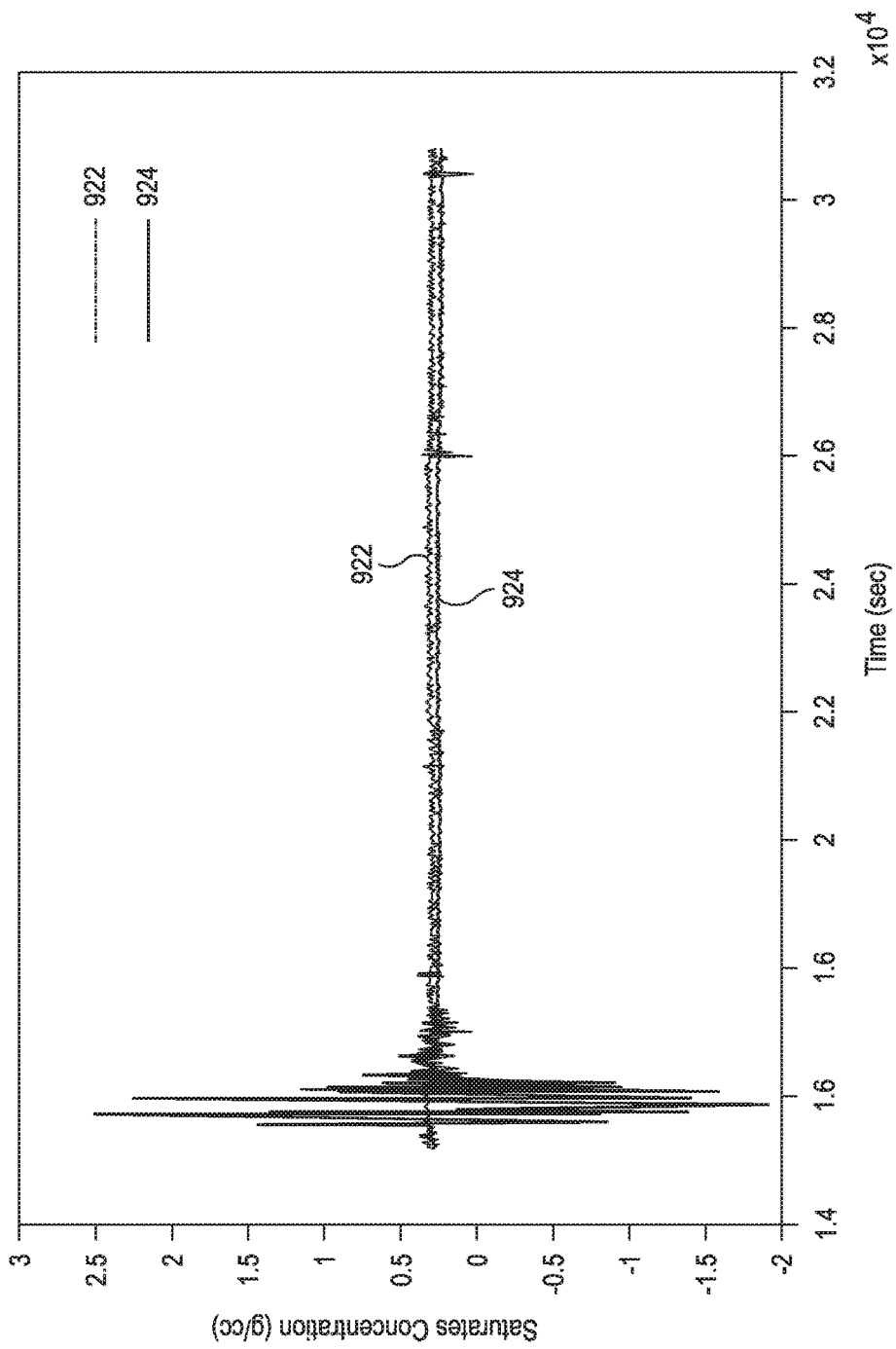

FIGS. 9C and 9D illustrate sample graphs showing results of matched prediction on saturates concentration and aromatics concentration, respectively. In this example, the predictions with master sensor responses from either upper or lower operational sensor of the downhole tool can be used for decision making because of their close similarity. The final predictions can also be obtained by averaging the outputs of the master sensor predictions from the upper and lower operational sensor inputs. In reference to FIGS. 9B-9D, it may be noted that the concentration of methane, saturates, and aromatics constitute the primary compositions of the volatile oil sample, which is consistent with live density prediction and densitometer measurements illustrated in FIG. 9A.

Figure 10:
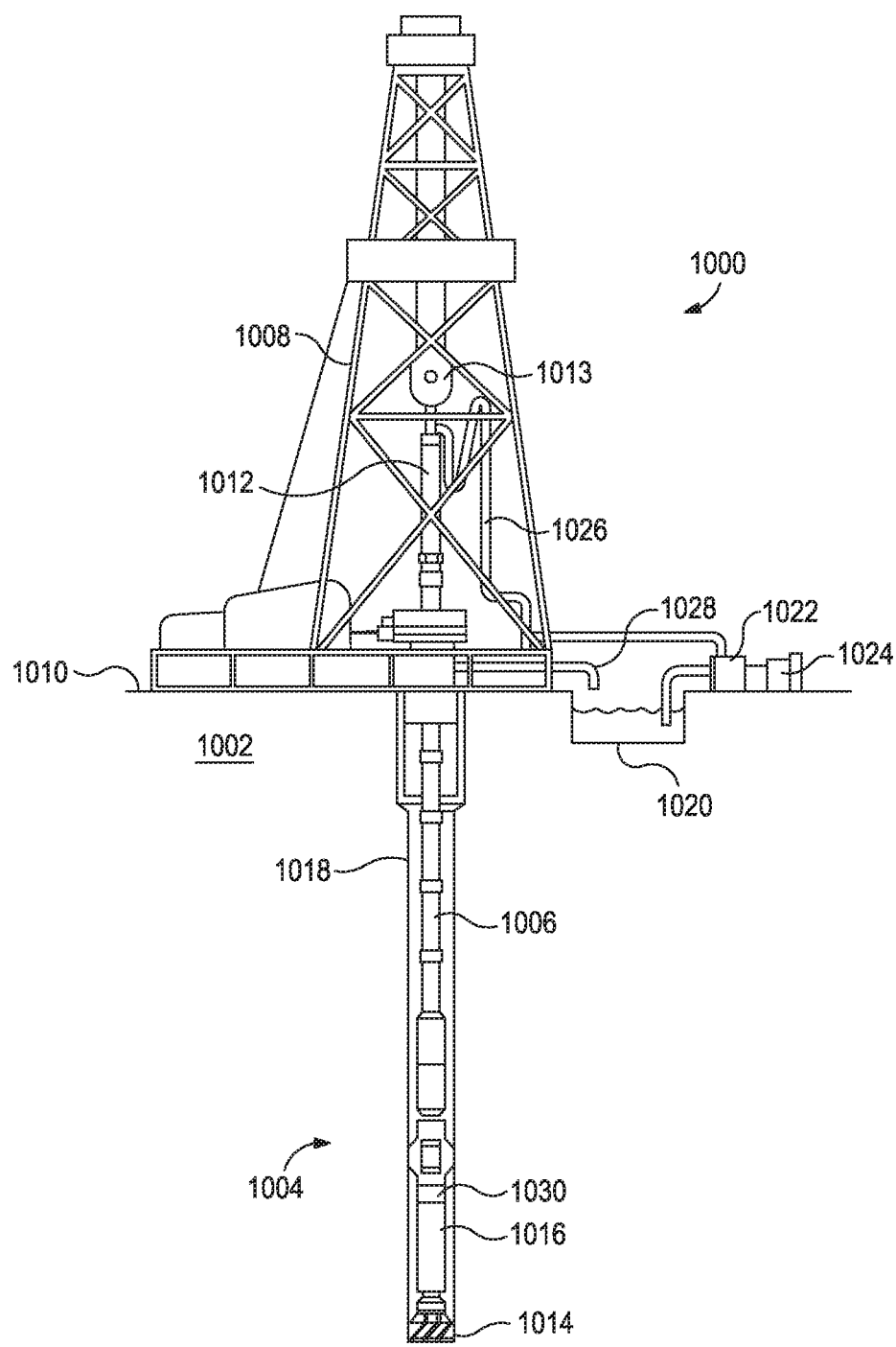
FIG. 10 is a drilling system configured to use a dual-sensor downhole tool including upper and lower operational sensors, and employing one or more principles of the present disclosure for modifying a drilling parameter or configuration in a measurement-while-drilling (MWD) and a logging-while-drilling (LWD) operation.

FIG. 10 is a drilling system 1000 configured to use a dual-sensor downhole optical tool including upper and lower operational sensors 122 for modifying a drilling parameter or configuration in a measurement-while-drilling (MWD) and a logging-while-drilling (LWD) operation according to the estimated borehole or formation fluid properties. Boreholes may be created by drilling into the earth 1002 using the drilling system 1000. The drilling system 1000 may be configured to drive a bottom hole assembly (BHA) 1004 positioned or otherwise arranged at the bottom of a drill string 1006 extended into the earth 1002 from a derrick 1008 arranged at the surface 1010. The derrick 1008 includes a kelly 1012 and a traveling block 1013 used to lower and raise the kelly 1012 and the drill string 1006.

The BHA 1004 may include a drill bit 1014 operatively coupled to a tool string 1016 which may be moved axially within a drilled wellbore 1018 as attached to the drill string 1006. During operation, the drill bit 1014 penetrates the earth 1002 and thereby creates the wellbore 1018. The BHA 1004 provides directional control of the drill bit 1014 as it advances into the earth 1002. The tool string 1016 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 1016, as shown in FIG. 10.

Fluid or "mud" from a mud tank 1020 may be pumped downhole using a mud pump 1022 powered by an adjacent power source, such as a prime mover or motor 1024. The mud may be pumped from the mud tank 1020, through a stand pipe 1026, which feeds the mud into the drill string 1006 and conveys the same to the drill bit 1014. The mud exits one or more nozzles arranged in the drill bit 1014 and in the process cools the drill bit 1014. After exiting the drill bit 1014, the mud circulates back to the surface 1010 via the annulus defined between the wellbore 1018 and the drill string 1006, and, in the process, returns drill cuttings and debris to the surface. The cuttings and mud mixture are passed through a flow line 1028 and are processed such that a cleaned mud is returned down hole through the stand pipe 1026 once again.

The BHA 1004 may further include a dual-sensor downhole optical tool 1030 similar to the downhole tools described above. More particularly, the dual-sensor downhole tool 1030 may have the upper and lower operational sensors 122 (not illustrated) arranged therein, and the downhole tool 1030 may be calibrated prior to being introduced into the wellbore 1018 using the sensor validation testing generally described herein. Based on the real-time fluid predictions of the optical tool, one or more drilling parameters such as drilling direction or penetration rate may be modified.

Figure 11:
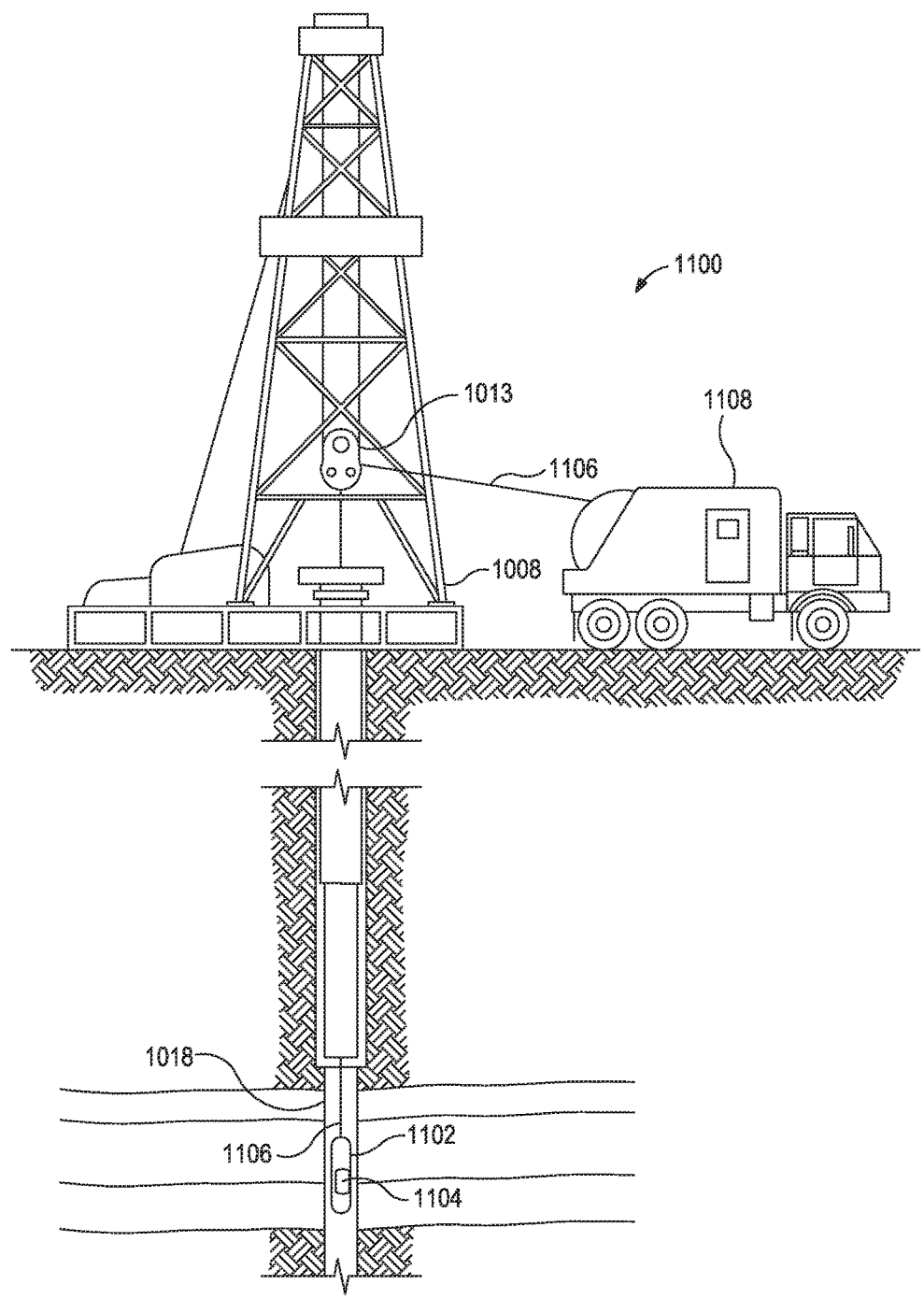
FIG. 11 is a wireline system configured to use a dual-sensor downhole tool including upper and lower operational sensors, and employing one or more principles of the present disclosure during formation testing and sampling.

FIG. 11 illustrates a wireline system 1100 that may employ one or more principles of the present disclosure. In some embodiments, wireline system 1100 may be configured to use a dual-sensor downhole optical tool described herein for formation testing and sampling. After drilling of wellbore 1018 is complete, it may be desirable to know more details of types of formation fluids and the associated characteristics through sampling with use of wireline formation tester. The system 1100 may include a downhole tool 1102 that forms part of a wireline logging operation that can include the exemplary upper and lower operational sensors, shown generally at 1104. The system 1100 may include the derrick 1008 that supports the traveling block 1013. The downhole tool 1102, such as a wireline logging tool, may be lowered by wireline or logging cable 1106 into the wellbore 1018. The downhole optical tool 1102 may be lowered to the potential production zone or the region of interest in the wellbore 1018, and used in conjunction with other system components such as packers, probes and pumps to perform well testing and sampling. The downhole tool 1102 may be configured to measure fluid properties of the formation fluids, and any measurement data generated by downhole tool 1102 and its associated operational sensors 1104 can be real-time processed for decision-making, or communicated to a surface logging facility 1108 for storage, processing, and/or analysis.

Figure 12:
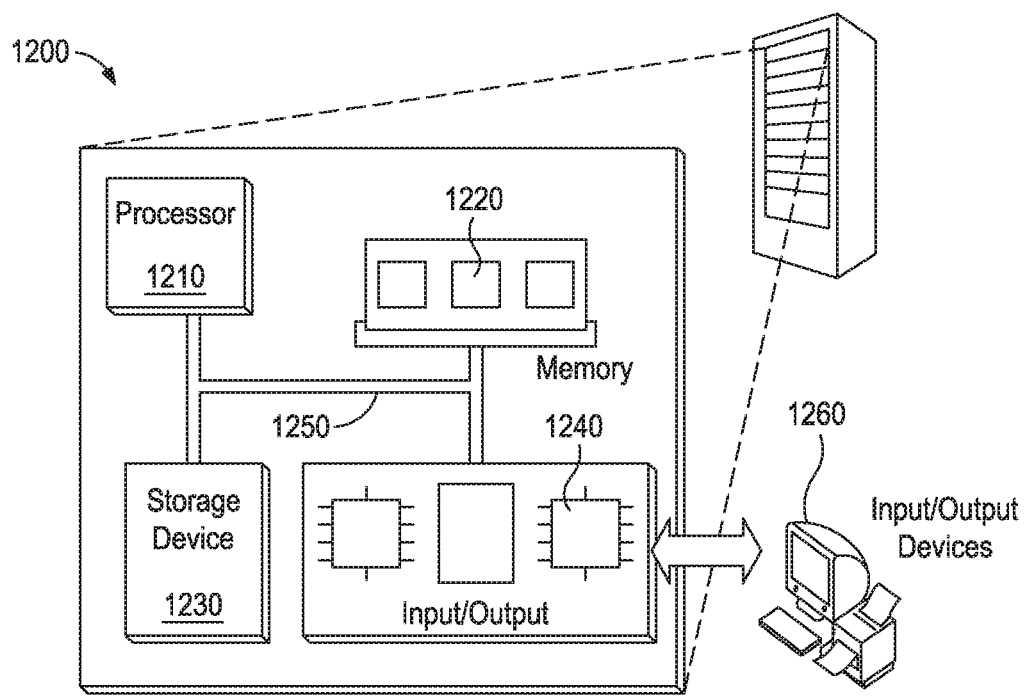
FIG. 12 illustrates an exemplary processing system for configuring and/or controlling the calibration system of FIG. 1 and the downhole tools of FIGS. 9 and 11.

FIG. 12 shows an illustrative processing system 1200 for implementing the features and functions of the disclosed embodiments. For instance, the system 1200 may process data received from the data analysis system 134 in FIG. 1, control the downhole tools 1030 and 1102 in FIGS. 10 and 11 above and may implement the method 600 disclosed above.

The system 1200 may include a processor 1210, a memory 1220, a storage device 1230, and an input/output device 1240. Each of the components 1210, 1220, 1230, and 1240 may be interconnected, for example, using a system bus 1250. The processor 1210 may be processing instructions for execution within the system 1200. In some embodiments, the processor 1210 is a single-threaded processor, a multi-threaded processor, or another type of processor. The processor 1210 may be capable of processing instructions stored in the memory 1220 or on the storage device 1230. The memory 1220 and the storage device 1230 can store information within the computer system 1200.

The input/output device 1240 may provide input/output operations for the system 1200. In some embodiments, the input/output device 1240 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 1260. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A. A method that includes collecting measurement data using a first operational sensor and a second operational sensor of a downhole tool, standardizing optical responses of each operational sensor to a master sensor in a tool parameter space to obtain a standardized master sensor response, transforming the standardized master sensor response to a synthetic parameter space response of the master sensor, applying a fluid model with the synthetic parameter space response of the master sensor to predict a fluid characteristic, comparing a first prediction obtained with the fluid model from the first operational sensor with a second prediction obtained with the fluid model from the second operational sensor, determining a fluid characteristic from the first prediction and the second prediction, and optimizing a well testing and sampling operation according to the determined fluid characteristic.

B. A method that includes determining matched density predictions of a fluid sample using master sensor fluid models, each of a first operational sensor and a second operational sensor providing a respective live density prediction, calculating a difference between density predictions and measurements obtained from a densitometer, and estimating a contamination index based on the difference.

C. A system that includes a downhole tool configured to be positioned in a wellbore for oil and gas production, the downhole tool comprising a first operational sensor and a second operational sensor each collecting measurement data from the wellbore, and a computer system comprising a processor and a memory, the computer system communicatively coupled to the downhole tool to obtain the measurement data, and the memory stores a program that, when executed by the processor, configures the processor to standardize optical responses of each operational sensor to a master sensor in a tool parameter space to obtain a standardized master sensor response, transform the standardized master sensor response to a synthetic parameter space response of the master sensor, and apply a fluid model with the synthetic parameter space response of the master sensor to predict a fluid characteristic.

Each of embodiments A, B, and C may have one or more of the following additional elements in any combination: Element 1: further comprising optimizing the standardized master sensor response obtained from the first and second operational sensors according to the first prediction and the second prediction. Element 2: wherein the first and second operational sensors are separated by a flow line and are positioned a predetermined distance from each other, and the method further comprises collecting measurement data using the first and second operational sensors having the same configuration and optical element design, and standardizing the optical responses to the master sensor having the same configuration and optical element design as the first and second operational sensors. Element 3: wherein the first and second operational sensors are separated by a flow line and are positioned a predetermined distance from each other, and the method further comprises, collecting measurement data using the first and second operational sensors having different configurations and optical element designs, and standardizing the optical responses to the master sensor having a different configuration and optical element design as the first and second operational sensors. Element 4: further comprising performing standardization of the optical responses of each operational sensor to the master sensor in tool parameter space, and by using a multi-input, multi-output neural network transformation algorithm. Element 5: calibrating the multi-input, multi-output neural network transformation algorithm on one or more reference, and standardizing the optical responses of each operational sensor to the master sensor using the multi-input, multi-output neural network transformation algorithm. Element 6: calibrating the multi-input, multi-output neural network transformation algorithm using optical responses of the first and second operational sensors obtained from at least one of lab testing and simulation analysis at matched temperatures and pressures. Element 7: processing calibration data with baseline correction, normalization, and environmental correction, and optimizing the neural network transformation algorithm. Element 8: transforming the standardized master sensor response from the tool parameter space to the synthetic parameter space of the master sensor using a cross-space transformation algorithm of the master sensor. Element 9: calibrating the cross-space transformation algorithm on the same reference fluids used for calibrating the multi-input, multi-output cross-sensor neural networks transformation algorithm, and calculating synthetic optical responses of the master sensor as a dot product of spectroscopy data of reference fluids and spectra of optical sensor elements of the first and second operational sensors over the same wavelength range and measured at predetermined temperatures and pressures, followed by baseline correction and neutral density normalization. Element 10: applying a plurality of master sensor fluid models including a plurality of analyte-specific candidate models with different inputs transformed from each of the first and second operational sensors for each analyte prediction. Element 11: calibrating the master sensor fluid models with a nonlinear neural network or a linear partial-least-square algorithm in synthetic parameter space on a plurality of fluid samples from a standard oil library, and using synthetic master sensor responses as candidate calibration inputs, and measured fluid compositions and properties as calibration outputs. Element 12: wherein the fluid models include multiple candidate models for each fluid analyte or property prediction, and the method further comprises determining the candidate calibration inputs using an automatic selection algorithm including a backward stepwise input selection or a forward stepwise input selection. Element 13: wherein comparing the first and second predictions comprises obtaining the first and second predictions using same inputs for a single phase fluid, determining a variation in the first and second predictions for a multi-phase fluid, estimating fluid contamination in a presence of an oil-based mud filtrate, and determining a phase of the fluid in a flow line by comparing a difference in optical responses recorded by the first and second operational sensors, and by measuring a density of the fluid, calculating a bubble point of the fluid, checking a fluid capacitance of the fluid, or checking a pumpout rate of the fluid. Element 14: wherein the measurement data collected by the downhole tool is optimized using real-time processing or post-processing routines, and the optimizing includes synchronizing predictions from the first and second operational sensors, adjusting a fluid model selection, and providing self-consistent estimation using at least one of the first and second operational sensors.

Element 15: wherein the live density prediction is a density prediction of the fluid sample including one or more dissolved gases. Element 16: further comprising calibrating the fluid models for live density prediction on the synthetic master sensor database without using a reference fluid density measured by the densitometer as input. Element 17: compensating the difference between live density prediction and densitometer measurement for uncertainty of prediction and measurements, and a change of pumpout rate during the formation testing and sampling. Element 18: calculating the contamination index with a pre-calibrated model, wherein calibration data is obtained from different tools and processed using master sensor based on available densitometer measurements and known lab results on the contamination index.

Element 19: wherein the processor is further configured to optimize the standardized master sensor response obtained from the first and second operational sensors according to a first prediction obtained with the fluid model from the first operational sensor and a second prediction obtained with the fluid model from the second operational sensor. Element 20: wherein the fluid characteristic is determined by comparing a first prediction obtained with the fluid model from the first operational sensor with a second prediction obtained with the fluid model from the second operational sensor, and the processor is further configured to adjust a drilling parameter according to the determined fluid characteristic.

By way of non-limiting example, exemplary combinations applicable to A: Element 4 with Element 5; Element 5 with Element 6; Element 6 with Element 7; Element 5 with Element 8; Element 8 with Element 9; Element 10 with Element 11; and Element 11 with Element 12.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   obtaining optical responses using a first operational sensor and a second operational sensor of a downhole tool;
   standardizing the optical responses of each operational sensor to a third sensor in a tool parameter space to obtain corresponding standardized optical responses;
   transforming the standardized optical responses to corresponding synthetic parameter space optical responses of the third sensor;
   applying a fluid model to each of each of the synthetic parameter space optical responses of the third sensor to determine a first fluid characteristic;
   comparing a first prediction of the first fluid characteristic obtained with the fluid model from the first operational sensor with a second prediction of the first fluid characteristic obtained with the fluid model from the second operational sensor; and
   determining a second fluid characteristic based on a comparison of the first prediction and the second prediction; and
   optimizing a well testing and sampling operation according to the determined second fluid characteristic.

2. The method of claim 1, further comprising optimizing the standardized optical responses obtained from the first and second operational sensors according to the first prediction and the second prediction.

3. The method of claim 1, wherein
   the first and second operational sensors are separated by a flow line and are positioned at a predetermined distance from each other, and
   the method further comprises:
   obtaining the optical responses using the first and second operational sensors having similar configuration and optical element design; and
   standardizing the optical responses to the third sensor having similar configuration and optical element design as the first and second operational sensors.

4. The method of claim 1, wherein
   the first and second operational sensors are separated by a flow line and are positioned at a predetermined distance from each other, and
   the method further comprises:
   obtaining the optical responses using the first and second operational sensors having different configurations and optical element designs; and
   standardizing the optical responses to the third sensor having a different configuration and optical element design as the first and second operational sensors.

5. The method of claim 1, further comprising performing the standardization of the optical responses of each operational sensor to the third sensor in a tool parameter space by using a multi-input, multi-output neural network transformation algorithm.

6. The method of claim 5, further comprising:
   calibrating the multi-input, multi-output neural network transformation algorithm on one or more reference fluids; and
   standardizing the optical responses of each operational sensor to the third sensor using the multi-input, multi-output neural network transformation algorithm.

7. The method of claim 6, further comprising
   calibrating the multi-input, multi-output neural network transformation algorithm using the optical responses of the first and second operational sensors obtained from at least one of lab testing and simulation analysis at matched temperatures and pressures.

8. The method of claim 7, further comprising:
   processing calibration data with baseline correction, normalization, and environmental correction; and
   optimizing the multi-input, multi-output neural network transformation algorithm.

9. The method of claim 6, further comprising
   transforming the standardized optical responses from the tool parameter space to a synthetic parameter space of the third sensor using the cross-space data transformation algorithm of the third sensor.

10. The method of claim 9, further comprising:
    calibrating the cross-space data transformation algorithm on the one or more reference fluids used for calibrating the multi-input, multi-output cross-sensor neural networks transformation algorithm; and
    calculating synthetic optical responses of the third sensor as a dot product of spectroscopy data of the one or more reference fluids and spectra of optical sensor elements of the first and second operational sensors over the same wavelength range and measured at predetermined temperatures and pressures, followed by baseline correction and neutral density normalization.

11. The method of claim 1, wherein applying the fluid model comprises applying a plurality of third sensor fluid models including a plurality of analyte-specific candidate models with different inputs transformed from each of the first and second operational sensors for each analyte prediction.

12. The method of claim 11, further comprising:
calibrating the plurality of third sensor fluid models with a nonlinear neural network or a linear partial-least-square algorithm in a synthetic parameter space on a plurality of fluid samples from a standard oil library; and
using synthetic optical responses from the third sensor as candidate calibration inputs, and measured fluid compositions and properties as calibration outputs.

13. The method of claim 12, wherein the plurality of third sensor fluid models include multiple candidate models for each fluid analyte or property prediction, and the method further comprises determining the candidate calibration inputs using an automatic selection algorithm including at least one of a backward stepwise input selection and a forward stepwise input selection.

14. The method of claim 1, wherein comparing the first and second predictions comprises:
obtaining the first and second predictions using same inputs for a single phase fluid;
determining a variation in the first and second predictions for a multi-phase fluid;
estimating fluid contamination in a presence of an oil-based mud filtrate; and
determining a phase of a fluid in a flow line by comparing a difference in optical responses recorded by the first and second operational sensors, and by at least one of measuring a density of the fluid, calculating a bubble point of the fluid, checking a fluid capacitance of the fluid, and checking a pumpout rate of the fluid.

15. The method of claim 1, wherein the obtained optical responses of each operational sensor obtained by the downhole tool are optimized using at least one of real-time processing and post-processing routines, wherein the optimization of the optical responses includes:
synchronizing the predictions from the first and second operational sensors;
adjusting a fluid model selection; and
providing self-consistent estimation using at least one of the first and second operational sensors.

16. A system, comprising:
a downhole tool configured to be positioned in a wellbore for oil and gas production, the downhole tool comprising a first operational sensor and a second operational sensor, wherein each sensor is configured to obtain optical responses from the wellbore; and
a computer system comprising a processor and a memory, the computer system communicatively coupled to the downhole tool to obtain the optical responses, and the memory stores a program that, when executed by the processor, configures the processor to:
standardize the optical responses of each operational sensor to a third sensor in a tool parameter space to obtain corresponding standardized optical responses;
transform the standardized optical responses to corresponding synthetic parameter space optical responses of the third sensor; and
apply a fluid model with each of the synthetic parameter space optical responses of the third sensor to predict a fluid characteristic.

17. The system of claim 16, wherein
the processor is further configured to optimize the standardized optical responses obtained from the first and second operational sensors according to a first prediction obtained with the fluid model from the first operational sensor and a second prediction obtained with the fluid model from the second operational sensor.

18. The system of claim 16, wherein the fluid characteristic is predicted by comparing a first prediction obtained with the fluid model from the first operational sensor with a second prediction obtained with the fluid model from the second operational sensor, and the processor is further configured to adjust a drilling parameter according to the predicted fluid characteristic.

* * * * *